United States Patent
Might

(10) Patent No.: US 7,383,251 B2
(45) Date of Patent: *Jun. 3, 2008

(54) METHOD AND APPARATUS FOR GATHERING AND EVALUATING INFORMATION

(76) Inventor: Robert J. Might, 752 Kentland Dr., Great Falls, VA (US) 22066

( * ) Notice: Subject to any disclaimer, the term of this patent is extended or adjusted under 35 U.S.C. 154(b) by 403 days.

This patent is subject to a terminal disclaimer.

(21) Appl. No.: 10/893,502

(22) Filed: Jul. 19, 2004

(65) Prior Publication Data

US 2004/0267794 A1  Dec. 30, 2004

Related U.S. Application Data

(63) Continuation of application No. 09/699,425, filed on Oct. 31, 2000, now Pat. No. 6,766,319.

(51) Int. Cl.
*G06Q 30/00* (2006.01)
*G07G 1/14* (2006.01)
*G06F 7/00* (2006.01)
*G06F 17/30* (2006.01)

(52) U.S. Cl. .................. 707/3; 707/4; 705/14
(58) Field of Classification Search ............... 705/14
See application file for complete search history.

(56) References Cited

U.S. PATENT DOCUMENTS

| | | | |
|---|---|---|---|
| 4,603,232 A | | 7/1986 | Kurland et al. |
| 5,084,819 A | * | 1/1992 | Dewey et al. .............. 434/262 |
| 5,566,291 A | | 10/1996 | Boulton et al. |
| 5,722,418 A | | 3/1998 | Bro |
| 5,890,149 A | * | 3/1999 | Schmonsees ................ 707/3 |
| 5,890,911 A | * | 4/1999 | Griswold et al. .......... 434/322 |
| 5,893,098 A | | 4/1999 | Peters et al. |
| 5,913,204 A | | 6/1999 | Kelly |
| 5,970,121 A | | 10/1999 | Homayoun |

(Continued)

FOREIGN PATENT DOCUMENTS

EP  1 035 490 A1  9/2000

(Continued)

OTHER PUBLICATIONS

Jamal Munshi, "A Method for Constructing Likert Scales", http://munshi.sonoma.edu/working/likert.htm, pp. 1-9, 1990.

(Continued)

*Primary Examiner*—John Cottingham
*Assistant Examiner*—Mariela D Reyes
(74) *Attorney, Agent, or Firm*—DLA Piper US LLP

(57) ABSTRACT

A continuous information gathering and evaluating system uses five highly coupled databases and software for gathering user input (respondent software), for evaluating input (evaluator software), and for administering the system (administrative software). The first database includes the categories of users for an organization. The second database stores information about each user. The third database includes all topics and issues of interest and queries for each combination of topic, issue, and respondent category. Responses to query statements are preferably collected using a 7 point Likert scale. The fourth database is the repository for the responses from users and appropriate statistics based on the responses. The fifth database includes authorization data and rules that determine how the process and system are implemented for a particular organization.

30 Claims, 17 Drawing Sheets

U.S. PATENT DOCUMENTS

| | | |
|---|---|---|
| 5,970,467 A | 10/1999 | Alavi |
| 6,029,195 A | 2/2000 | Herz |
| 6,047,234 A | 4/2000 | Cherveny et al. |
| 6,064,971 A | 5/2000 | Hartnett |
| 6,070,145 A | 5/2000 | Pinsley et al. |
| 6,088,702 A * | 7/2000 | Plantz et al. ............ 707/103 R |
| 6,093,026 A * | 7/2000 | Walker et al. ............. 434/322 |
| 6,112,049 A | 8/2000 | Sonnenfeld |
| 6,556,974 B1 * | 4/2003 | D'Alessandro ............. 705/10 |
| 6,766,319 B1 | 7/2004 | Might |
| 2002/0042733 A1 * | 4/2002 | Lesandrini et al. ........... 705/10 |

FOREIGN PATENT DOCUMENTS

| | | |
|---|---|---|
| WO | WO 99/45489 | 9/1999 |
| WO | WO 00/60490 | 10/2000 |
| WO | WO 01/46891 A1 | 6/2001 |

OTHER PUBLICATIONS

Robert J. Might, "An Evaluation of the Effectiveness of Project Control Systems", IEEE Transactions on Engineering Management, vol. EM-31, No. 3, Aug. 1984.

Robert J. Might, et al., "The Role of Structural Factors in Determining Project Management Success", IEEE Transactions on Engineering Management, vol. EM-32, No. 2, May 1985.

* cited by examiner

Your Opinions (and Comments), Please...

| Topic: Benefit Services | Strongly Disagree | Disagree | Mildly Disagree | Neutral | Mildly Agree | Agree | Strongly Agree | N/A |
|---|---|---|---|---|---|---|---|---|
| There is too much to do for the number of people doing it in benefits services | ○ | ○ | ○ | ○ | ○ | ○ | ○ | ⊙ |
| There is a clear set of procedures for my job in this area | ○ | ○ | ○ | ○ | ○ | ○ | ○ | ⊙ |
| I constantly need to find ways to improve morale | ○ | ○ | ○ | ○ | ○ | ○ | ○ | ⊙ |
| People complain about not having enough time to get work done in benefits services | ○ | ○ | ○ | ○ | ○ | ○ | ○ | ⊙ |
| I feel certain that the people I supervise in benefits services are happy | ○ | ○ | ○ | ○ | ○ | ○ | ○ | ⊙ |
| Communication among the people working in benefits services is very good. | ○ | ○ | ○ | ○ | ○ | ○ | ○ | ⊙ |

FIG. 9

EWS

Early Warning System

Main Menu

Exit EWS

Topics that you are authorized to evaluate the ◊ denotes topics of HOT interest to school officials
the ☺, ☹ denote topics with a significant change (positive or negative) in ratings since the last time period. Click on these to view a brief report

- ◉ 1999-2000 Harrison County School Satisfaction Survey.◊
- ○ 1999-2000 Harrison County School Satisfaction Survey-Lost Creek Elementary.◊
- ○ Consolidation.◊
- ○ EWS Evaluation.◊
- ○ RESA VII Evaluation.◊
- ○ 1999-2000 Harrison County School Satisfaction Survey-Norwood Elementary.
- ○ 1999-2000 Harrison County School Satisfaction Survey-United Tech. Center.
- ○ Academic Staff Development Services.
- ○ Adult Education Program. ☺ ☹
- ○ Alternative Education and Summer School Program.
- ○ Assessment/Evaluation Services. ☹
- ○ Attendance Enforcement.
- ○ Benefit Services.
- ○ Building Trades Instruction.
- ○ Clerical Support at District/Division Office.

[Select] [More Topics...]

FIG.10

EWS
Early Warning System

| Rating Legend |
|---|
| 1. Very Poor |
| 2. Poor |
| 3. Somewhat Poor |
| 4. Average |
| 5. Somewhat Good |
| 6. Good |
| 7. Very Good |

Statements and Good Ratings for
Topic: Redistricting
Issue: Accountability
(Over 45 Days Old)

| Statement | 5's | 6's | 7's |
|---|---|---|---|
| A greater emphasis needs to be placed on making sure that the people responsible for redistricting are being held accountable for their work. | 5 | 4 | 2 |
| No one really cares about whether or not the districts are divided correctly since no one is held accountable. | 7 | 4 | 3 |
| The people working on redistricting are held accountable if the districts are not divided correctly. | 3 | 9 | 2 |
| Total Responses in category: | 15 | 17 | 7 |

FIG. 16

METHOD AND APPARATUS FOR GATHERING AND EVALUATING INFORMATION

This application is a Continuation of application Ser. No. 09/699,425 filed Oct. 31, 2000, now U.S. Pat. No. 6,766,319, issued Jul. 20, 2004.

BACKGROUND OF THE INVENTION

1. Field of the Invention

This invention relates to a method and apparatus for gathering and evaluating qualitative inputs or feedback, including perceptions and opinions, from employees and customers.

2. Discussion of the Background

Leaders and managers use both quantitative and qualitative information to run their organization. Qualitative information from employees and customers is both difficult to gather and difficult to evaluate. However, qualitative information is often the most relevant input or feedback that a leader or manager needs.

Methods for gathering qualitative information from employees and customers range from very ad hoc (e.g. discussion over a cup of coffee, suggestion boxes, chat rooms, etc.) to standardized surveys. The ad hoc methods lack the consistency that is needed to make them reliable and repeatable. Each input must be evaluated separately—with no standards for comparison and no way to quantify the results. The value of most information gathered in an ad hoc method is dependent on the skills of the leader or manager who happens to be listening or reading the input. Ad hoc methods often provide inputs from a very small, vocal group of employees or customers. When this occurs leaders and managers cannot determine if the perceptions and opinions reflect the views of a majority or just a few individuals. The ad hoc methods lack the efficiency that is essential to making them a consistently valuable source of critical, qualitative information.

More standardized methods, such as surveys, provide the much-needed consistency, but they are not efficient enough to make them a continuous source of qualitative information that is needed by leaders and managers. For example, surveys take considerable time to develop, distribute, collect, and analyze. Once the analysis is complete the results must be conveyed to the appropriate managers for action. All of this takes both effort (labor hours and funding) and time (actual calendar days) that is not available. Time delays from the start of survey development until the appropriate manager has results significantly reduce the value of the information because it is too late. That is, when done right, a survey takes months and the information is quite often no longer important to the leaders and managers, or the information is too late to help. In addition, standard surveys cannot be used to identify trends in perceptions or opinions unless the same questions, or cleverly worded questions that are similar, are asked on repetitive surveys. The repetition makes employees and customers lose interest and surveys of this type are most likely left unanswered.

What is not available is a method and system that allows leaders and managers to rapidly identify and gather qualitative information from employees and customers on topics and issues that are important to them at the time the information is gathered. Existing methods and systems do not allow leaders and manager to identify trends in employee and customer perception in an effective and efficient manner. The advent of computers and the Internet has provided some efficiency in the distribution, collection and analysis of standardized surveys. However, these technologies have not overcome the major impediments that make standard surveys ineffective for gathering and evaluating continuous, consistent and cost effective inputs from employees and customers. Below is a list of the major steps in the development and use of standard surveys:

| Step | Standard Survey Process | Computer and Internet Impact |
|---|---|---|
| 1 | Determine that perceptions and opinions of employees and/or customers must be collected | None |
| 2 | Determine what specific perceptions and opinions are needed | None |
| 3 | Determine who should provide perceptions and opinions | None |
| 4 | Develop and approve a process or obtaining perceptions and opinions | None |
| 5 | Develop a format for an instrument for obtaining perceptions and opinions | None |
| 6 | Develop query statements or questions for obtaining perceptions and opinions | None |
| 7 | Distribute the instrument for obtaining perceptions and opinions | Internet impact is potentially significant |
| 8 | Collect and load data from each respondent | Significant impact of computers on electronic or machine readable responses; Internet impact on collection is potentially significant |
| 9 | Analyze data | Computer impact is significant on statistical computations; computer impact on interpreting results is minimal unless the formats for presentation are consistent |
| 10 | Develop and distribute reports | Computer impact on standard reports is significant |

Out of the ten steps listed above, the use of computers and the Internet has helped only in the collection and loading of the data (in the cases where the inputs are in electronic form or machine readable form), the analysis of the data, and the development and distribution of standard reports. The use of computers and the Internet has not helped in the majority of the steps listed above.

What is needed is a way to overcome the time consuming process of identifying the information needed, translating the identified information into an instrument for gathering the information, selecting the people who are to provide the information, compiling or modifying distribution lists to reflect the selection of respondents, analyzing (evaluating) the information and distributing the information to all the people who need it within an organization.

Specifically, what is needed is an effective and efficient method and system that:

Allows leaders and managers in an organization to obtain inputs from employees and customers on specific topics (products, activities or tasks, projects, programs, policies, benefits, etc.) in their organization at any time and with any frequency they desire;

Allows leaders and managers in an organization to obtain input from employees and customers on general issues (morale, adequacy of communications, customer satisfaction, level of team work, etc.);

Allows leaders and managers to identify trends with respect to employee and customer perceptions and opinions on both specific topics and issues;

Allows leaders and managers to identify when employees and customers perceive certain issues (e.g. inadequate communication) as very important with respect to specific topics (e.g. health benefits);

Allows leaders and managers to identify which groups of respondents are providing both positive and negative perceptions and opinions on specific topics and issues;

Allows all managers and leaders in an organization to rapidly evaluate inputs to help them gain a common view of the perceptions and opinions of employees and customers—thereby enhancing their ability to operate as a cohesive leadership team;

Provides leaders and managers at every level in the organization with critical, qualitative information they need to correct problems and make the organization more effective and efficient without having to wait for information and direction to flow down from a higher level leader or manager;

Allows employees and customers to pick the topics that are most important to them when they provide periodic input—thereby not subjecting them to many questions on lengthy surveys that are not relevant to them;

Ensures leaders and managers that the methods and techniques used to gather employee and customer input is consistent and reliable—without the normal time and effort needed to develop this confidence on individual survey instruments.

SUMMARY OF THE INVENTION

The present invention addresses the problems of the prior art by providing a method and system that effectively and efficiently provides leaders and managers with timely, valuable, qualitative inputs from employees, customers, and other users.

The present invention provides a process and system that allows leaders and managers in an organization to continuously select and update the importance of topics and issues for which that they require perceptions and opinions. From this initial list, the process and system provides each user with a list of relevant topics, based on the respondent categories the to which the user belongs. The leaders and managers can set the number of topics and the frequency that an employee may respond. The process and system provides a set of queries that elicits the opinions and perceptions of the user for each topic chosen by the user. In some embodiments, the user is required to respond to queries for topics designated as mandatory by the leaders and managers.

The process and system provide leaders and managers with the capability to rapidly evaluate inputs from thousands of employees and customers. The process and system automatically alert leaders and managers to both positive and negative trends in employee and customer perceptions and opinions. The process and system provide leaders and managers with the capability to analyze specific topics or issues and determine which categories of respondents are providing positive, negative or specific responses.

The system uses five highly coupled databases and software for gathering user input (respondent software), for evaluating input (evaluator software), and for administering the system (administrative software). The first database includes the categories of users for an organization. The second database stores information about each user, including name, password (if password protection is desired in a particular system), and category. The third database includes all topics that are of interest to the leaders and managers and all issues that are associated with these topics. The list is dynamic and grows based on the needs of the leaders and managers and free text comments received from the employees and customers. The third database also contains queries for each combination of topic, issue, and respondent category. To ensure consistency and rapid evaluation, all query statements are preferably "Seven Point Likert Statements" that range from "Strongly Disagree" to "Strongly Agree" in preferred embodiments. The fourth database is the repository for the responses from users and appropriate statistics based on the responses. The dates of the responses and the category of the respondents are also stored. The fifth database includes authorization data and rules that determine how the process and system are implemented for a particular organization. It is important to note that while these databases are described as separate, the databases could also be parts of a single database.

The respondent software automatically links each employee with the appropriate topics for which they are supervisors, performers or customers. Respondents can then choose the topics that are of most interest to them. The evaluator software allows leaders and managers to review all the topics for which they have permission. The software automatically identifies trends in topics and issues and allows the evaluator to "drill down" in detail to identify the most relevant issues for a topic and which respondent categories are providing positive and negative inputs. The process and system are preferably implemented on an organization's Intranet or the Internet.

BRIEF DESCRIPTION OF THE DRAWINGS

The aforementioned advantages and features of the present invention will be more readily understood with reference to the following detailed description and the accompanying drawings in which:

FIG. 9 is a view of a query window of the system of FIG. 1.

FIG. 10 is a view of a selection window of the system of FIG. 1.

FIG. 16 is a view of a query analysis window of the system of FIG. 1.

DETAILED DESCRIPTION

In the following detailed description, a plurality of specific details, such as specific issues and topics and types of communications networks, are provided in order to provide a through understanding of the present invention. The details discussed in connection with the preferred embodiments should not be understood to limit the present invention.

Figure 1:
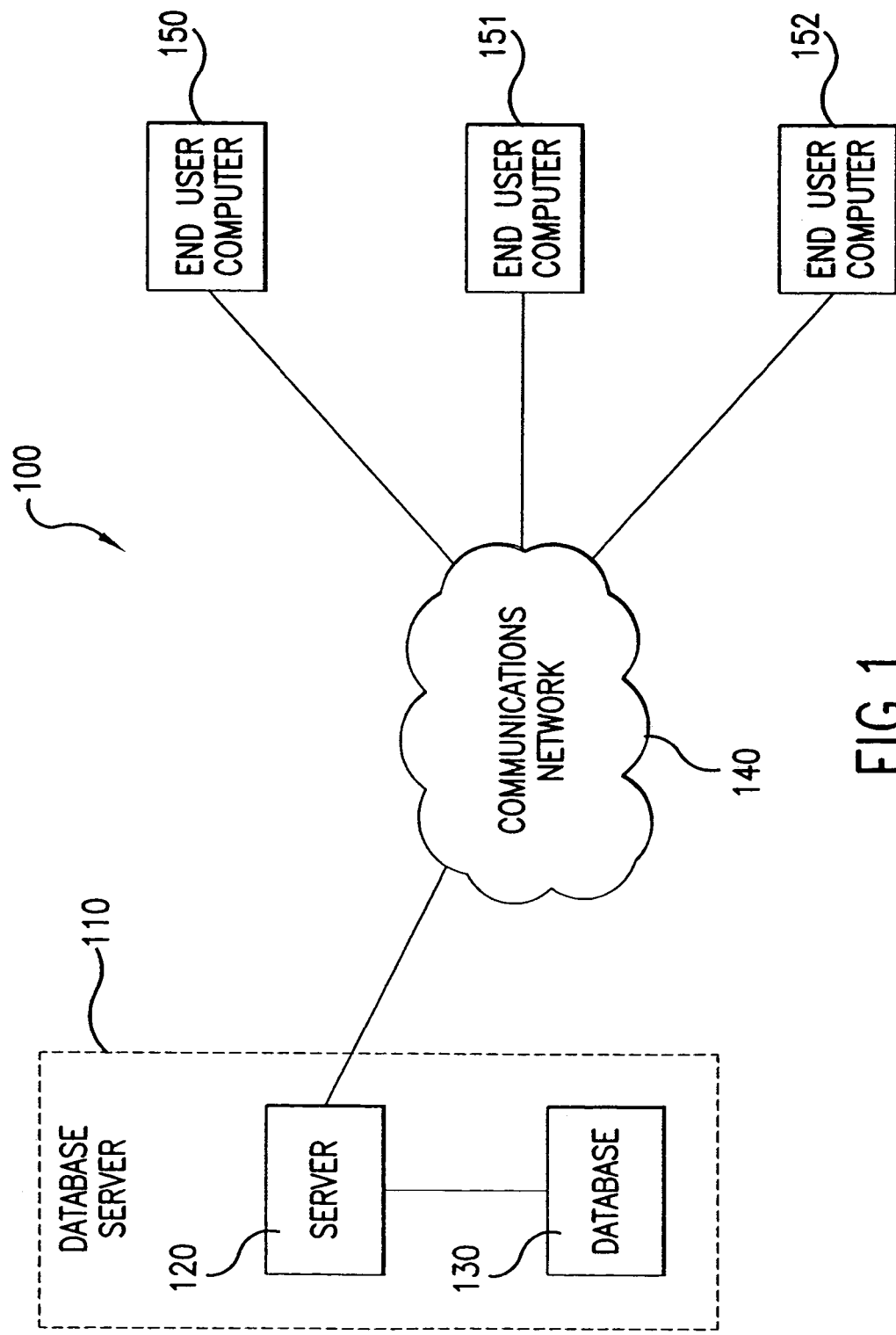
FIG. 1 is a block diagram of an information gathering system according to a preferred embodiment of the present invention.

FIG. 1 illustrates an information gathering and evaluating system 100 according to a preferred embodiment of the present invention. The system 100 comprises a database server 110, which includes a server 120 and a database 130. The database server 110 is connected to a communications network 140. In preferred embodiments, the communications network is the Internet or an organization's intranet. However, any communications network can be used. The communications network may also comprise a combination of networks, such as a LAN for local users and the Internet for remote users. Also connected to the communications network are a plurality of end user computers 150-152.

The database 130 includes five highly coupled databases. The first database includes the categories of users for an organization. An example of a portion of a category database for a school system is provided in Table 1 below:

TABLE 1

List of User Categories and Subcategories for a School System

Superintendent
    Associate Superintendents
        Associate Superintendent of Instruction
        Associate Superintendent of Management
        Associate Superintendent of School Services TABLE 1-continued List of User Categories and Subcategories for a School System Area Associate Superintendents
        Area 1 Associate Superintendent
        Area 2 Associate Superintendent
        Area 3 Associate Superintendent
Division Directors
    Director of Curriculum and Staff Development
    Director of Student Services
    Director of Planning and Assessment
    Director of Personnel
    Director of Finance
    Director of Risk Mgt and Security
    Director of Information Services
    Director of Transportation
    Director of Maintenance Staff
    Director of Food Services
Division Supervisors and Managers
    Curriculum Supervisors
    Science Curriculum Supervisor
    Math Curriculum Supervisor
    Social Studies Curriculum Supervisor
    English Curriculum Supervisor
    Foreign Language Curriculum Supervisor
    Fine Arts Curriculum Supervisor
    Vocational and Career Curriculum Supervisor
    Building Trades Curriculum Supervisor
    Supervisor of Title 1
    Administrative Coordinator of Head Start
    Administrative Coordinator of Instruction Support Team
    Supervisor of Gifted Education & Special Programs
    Supervisor of Alternative Education & Summer Schedule
    Supervisor of Adult Education Program
    Supervisor of Vocational and Career Education
    Supervisor of Instructional Technology
    Supervisor of Multicultural Education
    Supervisor of Guidance
    Special Education Supervisors
    PACE Principals
    Supervisor of Testing and Assessment
    Supervisor of Facilities & Real Property Planning
    Supervisor of Benefits
    Supervisor of Classified Personnel
    Supervisor of Elementary Personnel
    Supervisor of Secondary Personnel
    Director of Data Processing
    Supervisor of Budget
    Supervisor of Fiscal Operations
    Supervisor of Financial Services
    Construction Management
    Director of Construction
    Project Managers
    Supervisor of Media Production
    Supervisor of Community Relations
    Plant Operations Management
    Supervisor of Plant Operations
    Custodial Managers
    Supervisor of Supply Services
    Supervisor of Purchasing
Division Staff
    Clerical Staff
    Adult Education Staff
    Alternative Education and Summer School Staff
    Title 1 Staff
    Curriculum Staff
    Gifted Education and Special Programs Staff
    Head Start Staff
    Multicultural Education Staff
    Organizational Staff Development Team Members
    Instructional Support Team Members
    Special Education Staff
    Administrative Coordinator of Adult Education
    Administrative Coordinator for Guidance
    Student Services Staff
    Testing and Assessment Staff
    Facilities and Real Property Planning Staff
    Grants Coordinator(s)
    Benefits Staff
    Personnel Staff TABLE 1-continued List of User Categories and Subcategories for a School System

- Budget Staff
- Finance Staff
- Construction Staff
- Media Production Staff
- Community Relations Staff
- Food Services Staff
- Transportation Staff
- Supply Services Staff
- Purchasing Staff
- Maintenance Staff
- Custodial Services Staff
- Training and Safety Staff
- Vehicle Maintenance Staff
- School Administrators
  - Principals
    - Principals - Elementary
    - Principals - Middle/Intermediate
    - Principals - Secondary
  - Assistant Principals
    - Assistant Principals (D) - Discipline
    - Assistant Principals (S) - Science
    - Assistant Principals (M) - Math
    - Assistant Principals (E) - English
    - Assistant Principals (SS) - Social Studies
    - Assistant Principals (LA) - Language Arts
    - Assistant Principals (FA) - Fine Arts
    - Assistant Principals (FL) - Foreign Language
    - Assistant Principals (VC) - Vocational & Career Ed
    - Assistant Principals (BT) - Building Trades
    - Assistant Principals (SE) - Special Education
    - Assistant Principals (H&PE) - Health and Physical Education
    - Assistant Principals (1st) - 1st Grade
    - Assistant Principals (2nd) - 2nd Grade
    - Assistant Principals (3rd) - 3rd Grade
    - Assistant Principals (4th) - 4th Grade
    - Assistant Principals (5th) - 5th Grade
    - Assistant Principals (6th) - 6th Grade
  - Administrative Assistants
    - Administrative Assistants (D) - Discipline
  - Athletic Director
- Non-Academic School Staff
  - Non-Academic School Staff Managers
  - Psychological Support Services Providers
  - School Clerical Staff
  - School Maintenance/Facility Staff
  - Custodial Staff Manager
  - Custodial Staff
  - Food Service Staff
  - Security Staff
  - Athletic Activity Staff
  - Medical Staff
  - Library Staff
  - Printed Media
  - Film Library Staff
  - Academic Staff
- Academic Department Chairs
  - Mathematics Department Chair
  - English Department Chair
  - Science Department Chair
  - Social Studies Department Chair
  - Language Arts Department Chair
  - Fine Arts Department Chair
  - Foreign Language Department Chair
  - Vocational and Career Education Department Chair
  - Building Trades Department Chair
  - Health and PE Department Chair
  - Special Education Department Chair
- Teachers
  - Mathematics Teachers
  - English Teachers
  - Science Teachers
  - Social Studies Teachers
  - Language Arts Teachers
  - Fine Arts Teachers
  - Foreign Language Teachers
  - Vocational and Career Education Teachers
  - Building Trades Teachers
  - Health and PE Teachers
  - Special Education Teachers
  - 1st Grade Teachers
  - 2nd Grade Teachers
  - 3rd Grade Teachers
  - 4th Grade Teachers
  - 5th Grade Teachers
  - 6th Grade Teachers
  - Adult Education Teachers
  - Multicultural Education Teachers
  - Homebound Teachers
  - Gifted and Talented Teachers
  - Head Start Teachers
  - Summer School Teachers
  - Title 1 Teachers
  - Alternative Education Teachers
- Head Guidance Counselor
- Guidance Counselors
- Extra-curricular Activities Sponsors
- Coaches
  - Assistant Coaches
- Students
  - Mathematics Students
  - English Students
  - Science Students
  - Social Studies Students
  - Language Arts Students
  - Fine Arts Students
  - Foreign Language Students
  - Vocational and Career Education Students
  - Building Trades Students
  - Health and PE Students
  - Special Education Students
  - 1st Grade Student
  - 2nd Grade Student
  - 3rd Grade Student
  - 4th Grade Student
  - 5th Grade Student
  - 6th Grade Student
  - Adult Education Students
  - Multicultural Education Students
  - Gifted and Talented Students
  - Homebound Students
  - Head Start Students
  - Summer Students
  - Title 1 Students
  - Alternative Education Students
  - Athletes
  - Extra-curricula Students
  - Students Using Psychological Support Services
- Volunteers
  - Athletic Booster Club Member
- Community
- Parents
  - Mathematics Parents
  - Science Parents
  - English Parents
  - Social Studies Parents
  - Language Arts Parents
  - Fine Arts Parents
  - Foreign Language Parents
  - Vocational and Career Education Parents
  - Building Trades Parents
  - Special Education Parents
  - Health and PE Students
  - 1st Grade Parent
  - 2nd Grade Parent
  - 3rd Grade Parent
  - 4th Grade Parent
  - 5th Grade Parent
  - 6th Grade Parent
  - EWS Administrator
  - RESA VII Trial User Groups
  - Superintendents
  - RESA Board Members
  - Gear Up Site Coordinators
  - Gear Up County Contacts

TABLE 1-continued

List of User Categories and Subcategories for a School System

Staff Development Coordinators
Staff Development Council Members
PDS Group
Student Teachers
PDS Evaluator The database includes three "levels" of user categories. The highest, or top, level category includes categories such as School Administrators. The next level category includes subcategories such as Principals, while the third level category involves a still further subcategory such as Elementary School Principals. Not all top level categories have subcategories. For example, the Community group in Table 1 has no subcategories. Inclusion in a low level category automatically results in inclusion in all upper level categories. Thus, a user who is part of the elementary school principal category is automatically a part of the principal and school administrator categories. This is not true in the reverse direction, however. Furthermore, it is possible to be part of a category with out being a part of any of its subcategories. For example, it is possible for a user to be a part of the Volunteers category without being part of its only subcategory, Athletic Booster Club Members. This would be the case for a user such as a user who volunteers to help younger children learn to read after school.

The selection of user categories and subcategories is made in light of the desired level of focus. As will be further discussed below, each issue may have multiple queries, some of which may be generated for specific categories or subcategories of users. The decision as to how focused the respondent categories are will depend in part upon the need or desirability of tailoring questions for specific groups and in part upon the need or desirability of analyzing responses, even if the responses are to general questions, among a specific set of respondents. For example, one issue applicable to a school environment is school safety. A general question that may be asked of all respondents is "I always feel safe when I am in the school or on the grounds." Although the query may not be directed towards a specific group, it may be very desirable to analyze the responses by user categories such as students and teachers, and subcategories such as high school students vs. elementary school students, etc. In some embodiments of the invention, it is possible to gather responses for certain issues from certain categories and/or subcategories of respondents. Thus, if absenteeism is believed to be an issue only for high schools, then queries may be directed at only of high school teachers and students, rather than including all subcategories of teachers and students. In preferred embodiments of the invention, the respondent category database is dynamic; that is, categories and subcategories are added or deleted as perceived needs change.

The second database stores information about each user, including name, password (if password protection is desired in a particular system), and category. The categories may be freely selected by the users, or the categories for each user may be predefined. This database may store other information as well, such as addresses, identification numbers, etc.

The third database includes all topics that are of interest to the leaders and managers and all issues that are associated with these topics. A topic is some element of an organization that is of interest to leaders and managers. Topics can be an organizational process or functional area (e.g. clerical support), a specific program or project (e.g., a Head Start program in elementary schools), or any unique combination of activities in an organization. Topics are unique and do not overlap. Issues are areas within an organization that overlap one or more topics. For example, "morale" is an issue that is of interest across most functional areas and on most major programs and projects. In preferred embodiments, an issue cannot belong to a single topic; rather, it is a topic unto itself. The set of issues that are applicable to each specific topic varies among topics.

A partial list of topics and issues that may be of interest in a school system is presented in Table 2 below:

TABLE 2

Partial List of Topics and Issues of Interest in a School System

| Topic | Issue |
|---|---|
| instruction | absenteeism |
| | class participation |
| | communication |
| | customer satisfaction |
| | discipline |
| | effectiveness |
| | efficiency |
| | environment |
| | evaluation |
| | morale |
| | parent involvement |
| | participation |
| | resources |
| | student motivation |
| | substitute teachers |
| | work load |
| | worker background |
| Clerical Support | communication |
| | customer background |
| | customer satisfaction |
| | management |
| | morale |
| | policies & procedures |
| | team work |
| | work load |
| | worker background |
| General Achievement Testing | appropriateness |
| | effectiveness |
| | positive impacts |
| | negative impacts |
| | validity |
| | timing |
| | quantity |

In preferred embodiments, each issue is applicable to more than one topic. Said another way, if an area of interest that might be classified as an issue is applicable to only one topic, then that area of interest is made a topic unto itself, rather than being classified as an issue relevant to a topic. The list of topics and issues is preferably dynamic and grows based on the needs of the leaders and managers and free text comments received from the employees and customers.

The third database also contains queries for each combination of topic, issue, and respondent category. The query statements are preferably either very positive or very negative statements about the topic and its related issues. An exemplary partial listing of queries for the General Achievement Testing topic of Table 2 is presented below in Table 3:

TABLE 3

Sample Partial List of Query Statements for
Elementary and Secondary Schools

| Topics | Issues | Respondent Category | Query Statements |
| --- | --- | --- | --- |
| General Achievement Testing | appropriateness | teacher, administrators | State mandated tests to assess the quality of a schools teaching are a good idea. |
| | | | I don't think state mandated tests to assess how well schools teach is a good idea. |
| | | | State mandated tests that are used to accredit schools help keep the quality of education high. |
| | | | I support mandated testing to ensure each school maintains high standards. |
| | effectiveness | parents | State and County mandated tests are valid measures of what my child has learned. |
| | | | My experience indicates that State and County mandated tests are good measures - they help identify what our children have learned. |
| | | | State and County mandated tests are very useful ways to identify what a I have learned at our school. |
| | | | State and County mandated tests are not valid measures of what our children learned at our school. |
| | effectiveness | students | State and County mandated tests are valid measures of what I have learned. |
| | | | My experience indicates that State and County mandated tests are good measures - they help identify what I have learned. |
| | | | State and County mandated tests are very useful ways to identify what a I have learned at our school. |
| | | | State and County mandated tests are not valid measures of what I have learned at our school. |
| | positive impacts | teacher, administrators | I think state mandated tests that measure student learning help motivate our students. |
| | | | Students see state mandated tests that will determine if they can move to the next grade and eventually graduate from high school as a real motivator. |
| | | | State mandated tests that determine if a student moves on or is held back do not help motivate our students. |
| | | | State mandated tests that measure what students have learned are a definite asset in our move to improve the quality of our education system. |
| | | | I believe that state mandated tests that determine what our students are learning will help us raise the quality of education at our school. |
| | | | State mandated tests that attempt to determine what students have learned do not help improve the quality of education at our school. |
| | Positive impacts | students | I think state mandated tests that measure learning help motivate me to learn more. |
| | | | I see state mandated tests that determine if I can move to the next grade and eventually graduate from high school as a real motivator. |
| | | | State mandated tests that determine if I move on or am held back do not motivate me to learn. |
| | | | State mandated tests that measure what I have learned are a definite asset in our school's move to improve the quality of our education system. |
| | | | I believe that state mandated tests that determine what I am learning will help raise the quality of education at our school. |
| | | | State mandated tests that attempt to determine what I have learned do not help improve the quality of education at our school. |

The fourth database is the repository for the responses from users. In order to facilitate analysis, responses are preferably gathered according to a uniform scale oriented along the same direction. In highly preferred embodiments, the responses are gathered in the form of 7 point Likert scale. The reliability of a 7 point Likert scale is well established. As discussed above, the queries are positive or negative statements about the topic/issue. Respondents use the scale to record their agreement or disagreement with the query statements. Therefore, when a respondent "strongly agrees," "agrees," or "mildly agrees," with a very positive statement (a 7, 6, or 5, respectively, on a 7 point Likert scale), the response is placed in the positive set of responses. Likewise, when the respondent "strongly disagrees," "disagrees," or. "mildly disagrees" (a 1, 2, or 3, respectively, on a 7 point Likert scale), the response is placed in the negative set of responses. (A 4 on the Likert scale corresponds to no opinion.) The placement of responses is reversed when the query statement is very negative. That is, disagreeing with a negative statement is viewed as a positive perception or opinion.

In some embodiments, the raw responses are stored. That is, a separate entry in the database is made indicating the respondent category, the date of the response, the query and the response itself. Those of skill in the art will appreciate that the storage requirements for such a scheme can be impractically large. Therefore, in embodiments with large numbers of users, statistical information rather than raw numbers, may be stored. Statistical information includes information such as the percentages of positive and negative responses and the total number of responses for each query statement, along with an indication of which respondent category the respondents belong to and the date of the response. In such embodiments, the statistical information may be generated in a batch process scheduled to run overnight.

The fifth database includes authorization data and rules that determine how the process and system are implemented for a particular organization. The rules preferably vary by organization. Rules address such issues as whether users who are providing opinions must respond to all topics, are completely free to choose topics, or a mix of the two wherein certain topics must be replied to while replies to others are optional. Exemplary rules will be set forth below in connection with the operational description of preferred embodiments.

It is important to note that the division of databases discussed above is but one possible division. For example, one of the five databases discussed above includes topics, issues and queries. Those of skill in the art will recognize that these could also be separated into different databases. Alternatively, one or more of the databases described above could be combined into a single database. It is not important whether the information in the databases described above resides in one or more separate files or on one or more separate data storage devices; rather, it is the logical interrelationships between the information that is important.

In operation, users of the continuous feedback system perform seven major tasks. Not all tasks are performed by all categories of users. The seven tasks are as follows:

1. Registration
2. Log-In
3. Prioritization of Topics and Issues
4. Provide Perceptions and Opinions
5. Evaluation of Responses
6. Generation of Reports
7. System Administration Each of these tasks will be discussed in detail below. Rules applicable to each task in preferred embodiments will also be discussed.

Figure 2:
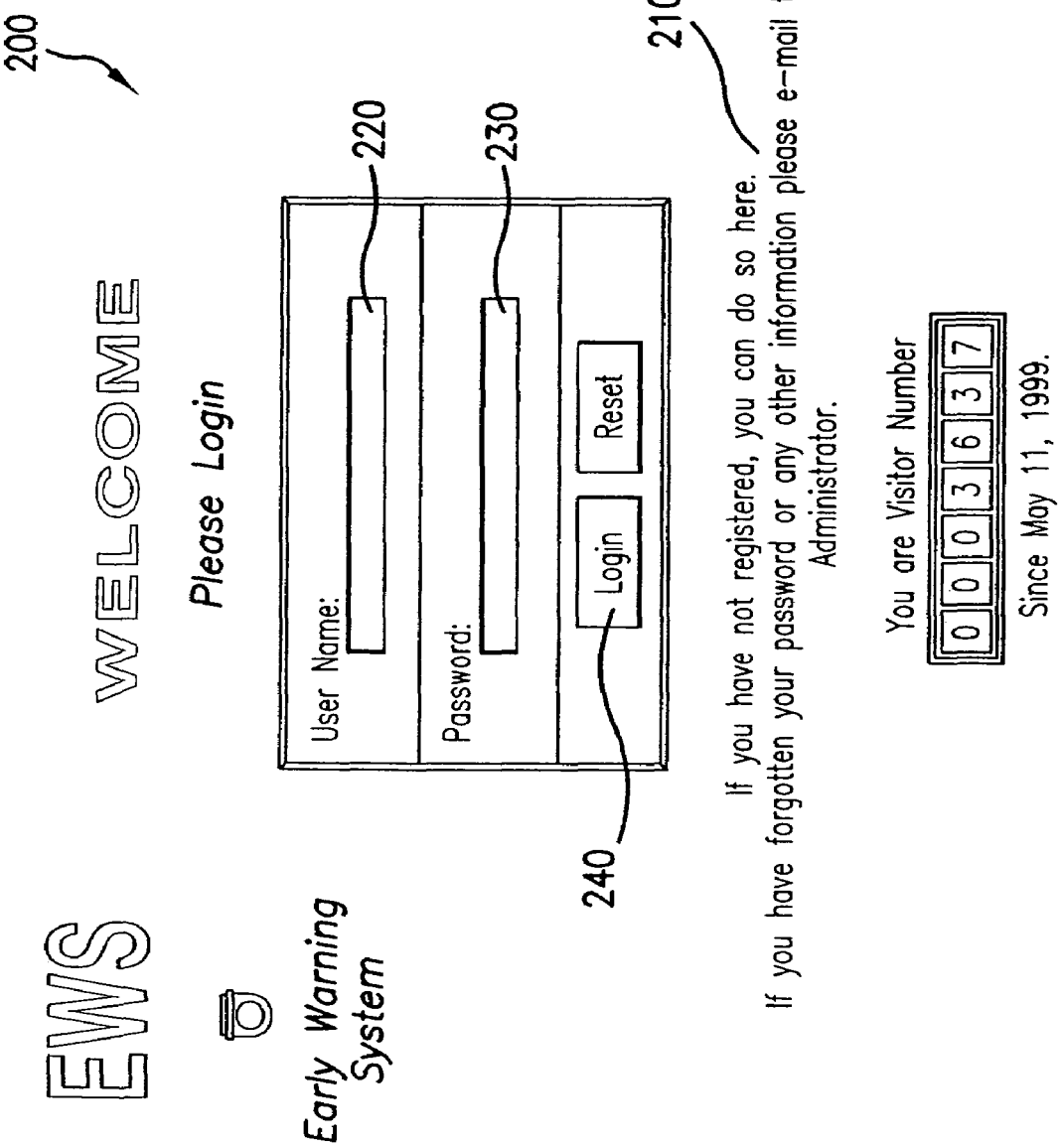
FIG. 2 is a view of a login window of the system of FIG. 1.
Figure 3:
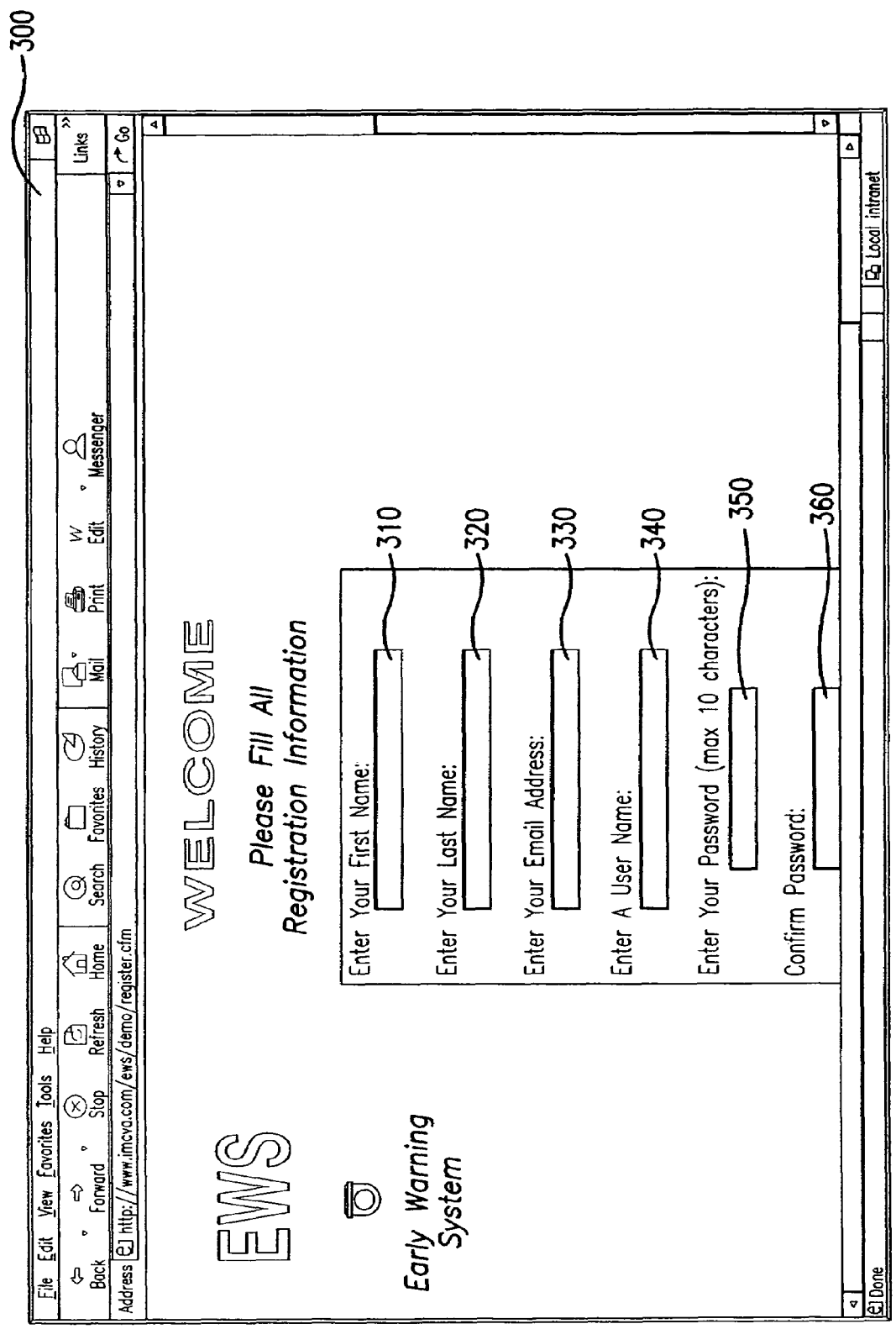
FIG. 3 is a view of a registration window of the system of FIG. 1.
Figure 4:
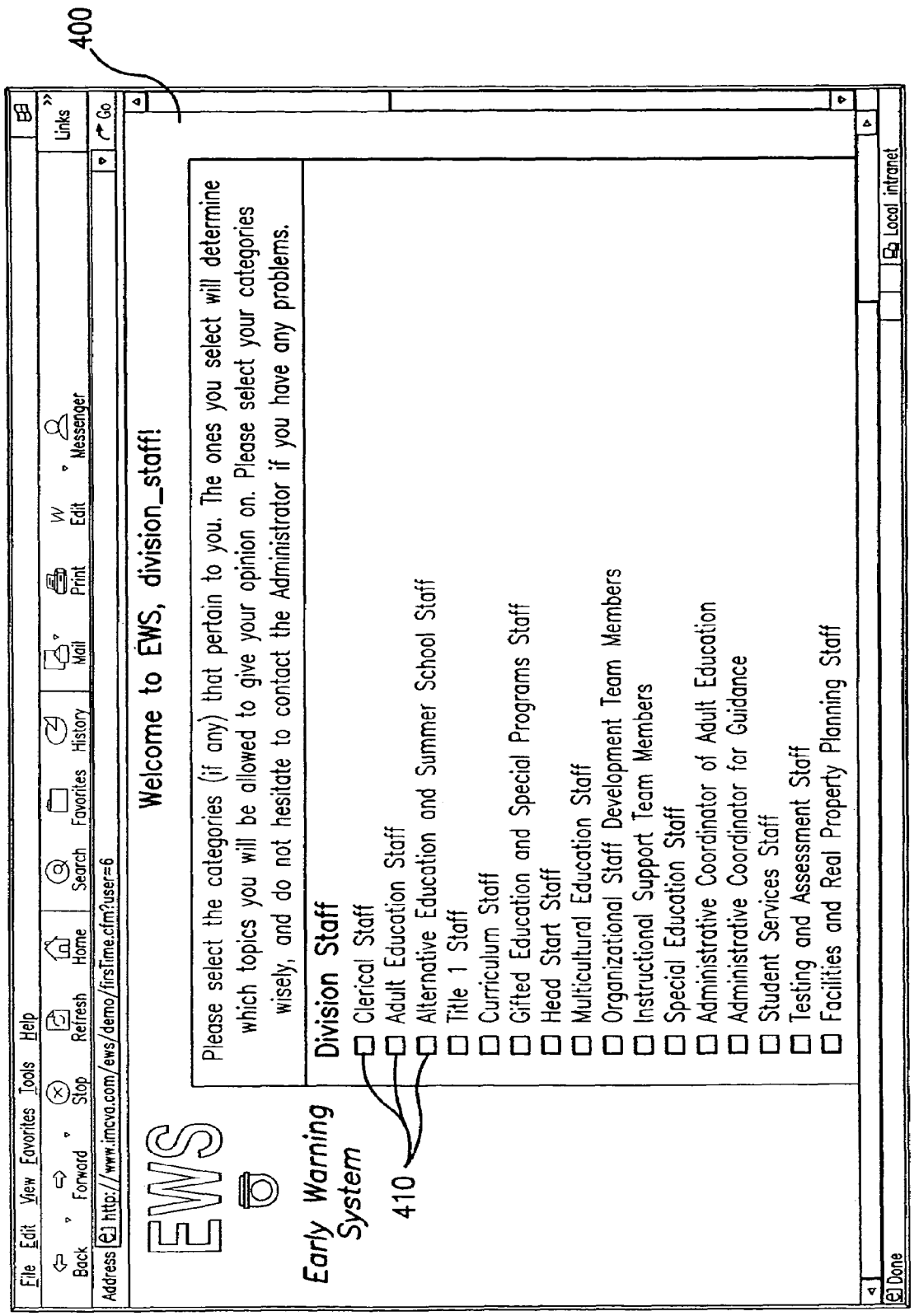
FIG. 4 is a view of a respondent category selection window of the system of FIG. 1.

Registration: Upon startup, a user is presented with a Login window 200 as shown in FIG. 2. A user who has not yet registered clicks on the "here" hypertext 210, at which point the user is presented with the Registration window 300. The Registration window 300 includes dialog boxes 310-360 in which a new user may enter the appropriate registration information including first name, last name, email address, a user name and a password. The following actions/responses and business rules define this process in preferred embodiments:

System action—the system will present a user with a screen that allows him or her to self-assign a user name and password User activity—enter a user name and password System response—the system will accept or reject a user name; if a name is accepted it will store the name and password in the respondent database Rule—The system will either accept a user name if it matches a name on a list provided by the using organization or accept all user names for later validation if there is no list provided by the using organization Once the requested identification information has been entered, the user is presented with the Respondent Category Selection window 400 as shown in FIG. 4. The user may indicate, in one or more checkboxes 410, the categories to which the user belongs. In some embodiments, the user is allowed to select whatever categories he or she desires. In such embodiments, the user's selections may be compared to a list of appropriate categories provided by leaders and modified to match the list as required. In other embodiments, such a list may be provided beforehand and used by the system to reject selections made by the user. Of course, if such a list is provided in advance, it is possible to have the system automatically perform this step; however, there is some value in having the user perform this process in any event as there is an educational value to being exposed to the various categories. As discussed above, checkboxes 410 are preferably provided for each entry in Table 1, regardless of its level in Table 1. Preferably, a user is automatically entered in all higher level categories upon the selection of a lower level category. Upon selection of appropriate categories, the Registration process is complete.

The following actions/responses and business rules define this process in preferred embodiments:

System action—the system presents a user with a screen that allows him or her to record the user categories to which he or she belongs (see FIG. 4)

User activity—the user will check all categories to which he or she belongs

System response—the system will either accept or reject categories for this user; if a category is accepted it is stored in the respondent database with this user's data Rule—accept categories for each user if they match a list provided for each user by the using organization or accept categories for later validation if there is no list provided by the using organization; else reject and require user to re-select categories.

Figure 5:
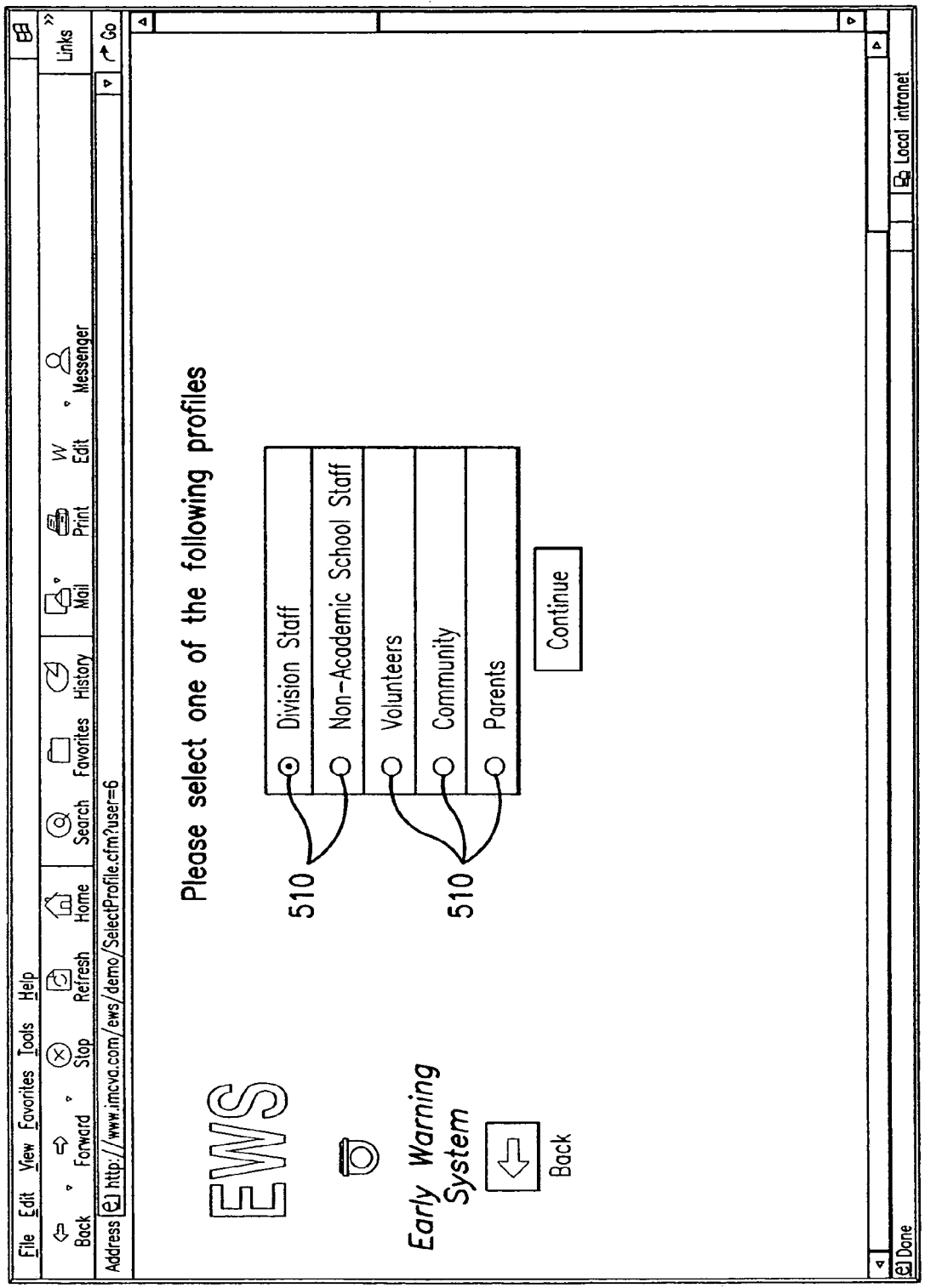
FIG. 5 is a view of a profile window of the system of FIG. 1.

LogIn: Registered users must log in each time the system is used Upon accessing the system, a user is presented with LogIn window 200 as discussed above. The user types the appropriate user name and password at dialog boxes 220 and 230 and clicks on the Login button 240. If the user name and password information are correct, the user is presented with the Profile window 500 of FIG. 5 in one preferred embodiment. The following actions/responses and business rules define this process in preferred embodiments:

System action—the system presents users with a screen that has a button 510 that allows them to enter or modify their user categories (option 1) or select a single user category from their profile for this session (option 2) (see FIG. 5)

Option 1

User activity—the user will click the "button" if his or her user category data was not entered at registration or has changed System response—the system provides the user with a screen that allows the user to enter user category data (same screen used during registration)

User activity—the user checks all categories to which they belong

System response —the system either accepts or rejects new user categories; store data in respondent category database Rules—the organization establishes rules on when and under what circumstances users may change their user profile (respondent categories); the rules from the register function for accepting or rejecting user categories apply here also Option 2

User activity—select the user category they are using for this session

System response—the system provides a main menu with options that are appropriate for the user category selected.

After the profile selection, the user may then select an activity which he wishes to perform. This is preferably accomplished through the Activity Selection window 600 of FIG. 6. This window 600 provides a listing 610 of activities. In preferred embodiments, only those activities for which a user is authorized are presented in the listing 610.

Figure 7:
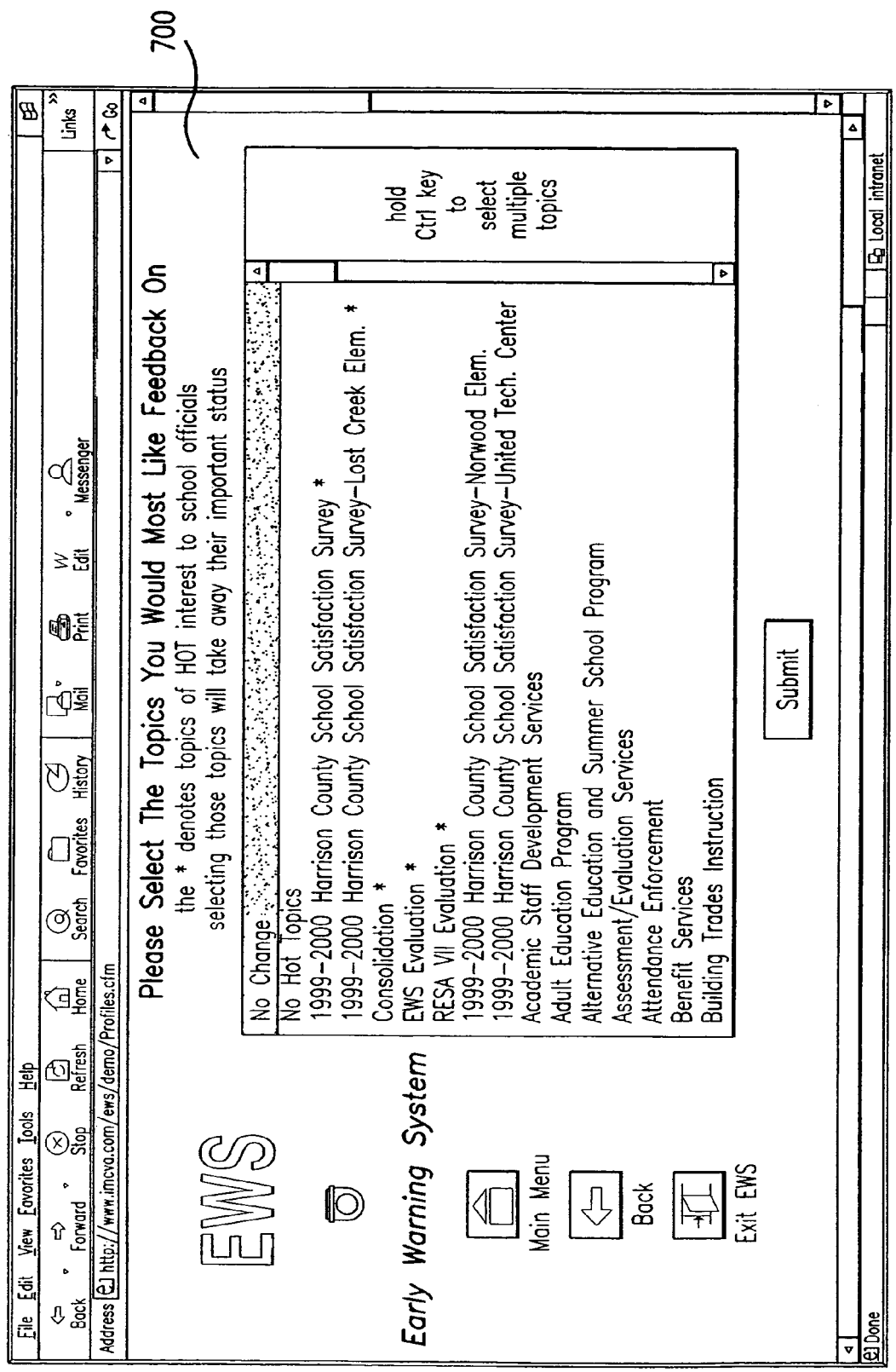
FIG. 7 is a view of a hot topic specification window of the system of FIG. 1.

Prioritization of Topics and Issues: One of the most important activities is the prioritization of topics and issues. If the user selects the "Specify Hot Topics" activity from listing 610 (topic prioritization is performed by specifying a topic as hot in preferred embodiments), the user is presented with the Hot Topic Specification window 700 of FIG. 7. This window contains a listing 710 of all topics in Table 2. The user clicks on any topic in listing 710. Upon selection of a topic, that topic is designated as a hot topic. Designation of a topic as a hot topic may have one or more consequences as specified in the business rules database. Among the possible consequences are 1) that the topic may be displayed more prominently than non-hot topics, either by being marked by a special character or being displayed at the top of the list of available topics; and 2) that a user may be forced to provide opinions for a designated hot topic before being allowed to provide opinions on other topics. In preferred embodiments, a single individual is designated with the authorization to select and deselect hot topics—this individual may be the senior person in the organization or someone designated by the senior person.

The following actions/responses and rules define the Hot Topic Specification process in preferred embodiments:

User activity—the user selects Prioritize HOT Topics from listing.

System response—the system provides a screen with a list of topics for which user is authorized to mark as "hot topics"; obtain authorized list from authorization table in the business rule database Rule—the senior person in the organization delegates authorization; this delegation is maintained in business rule database User activity—the user selects new "hot topics" and de-select existing "hot topics" by highlighting each topic on the list System response—the system will add and remove topics from the "hot topics" list A user may also select "Prioritize Issues" from the listing 610. In this situation, each topic is assigned a topic owner. The topic owner has the sole authority to prioritize issues (as listed in Table 2) in preferred embodiments. In preferred embodiments, issues are prioritized by assigning a percentage of queries to each issue in the topic.

The following actions/responses and business rules define this process in preferred embodiments:

User action—the user selects "Prioritize Issues" from listing 610.

System response—the system ensures the user is authorized to prioritize issues; then provides a screen with a list of all issues in the database for authorized user to prioritize Rule—only the topic owner may set the percentages of query statements for each issue in a topic User activity—the user enters the percentage of query statements that are to be selected from the database for each issue associated with a topic Rule—the user may enter any percentage for an issue between 1% and 100%; however, the total for all issues that are selected for prioritization may not exceed 100%

Figure 6:
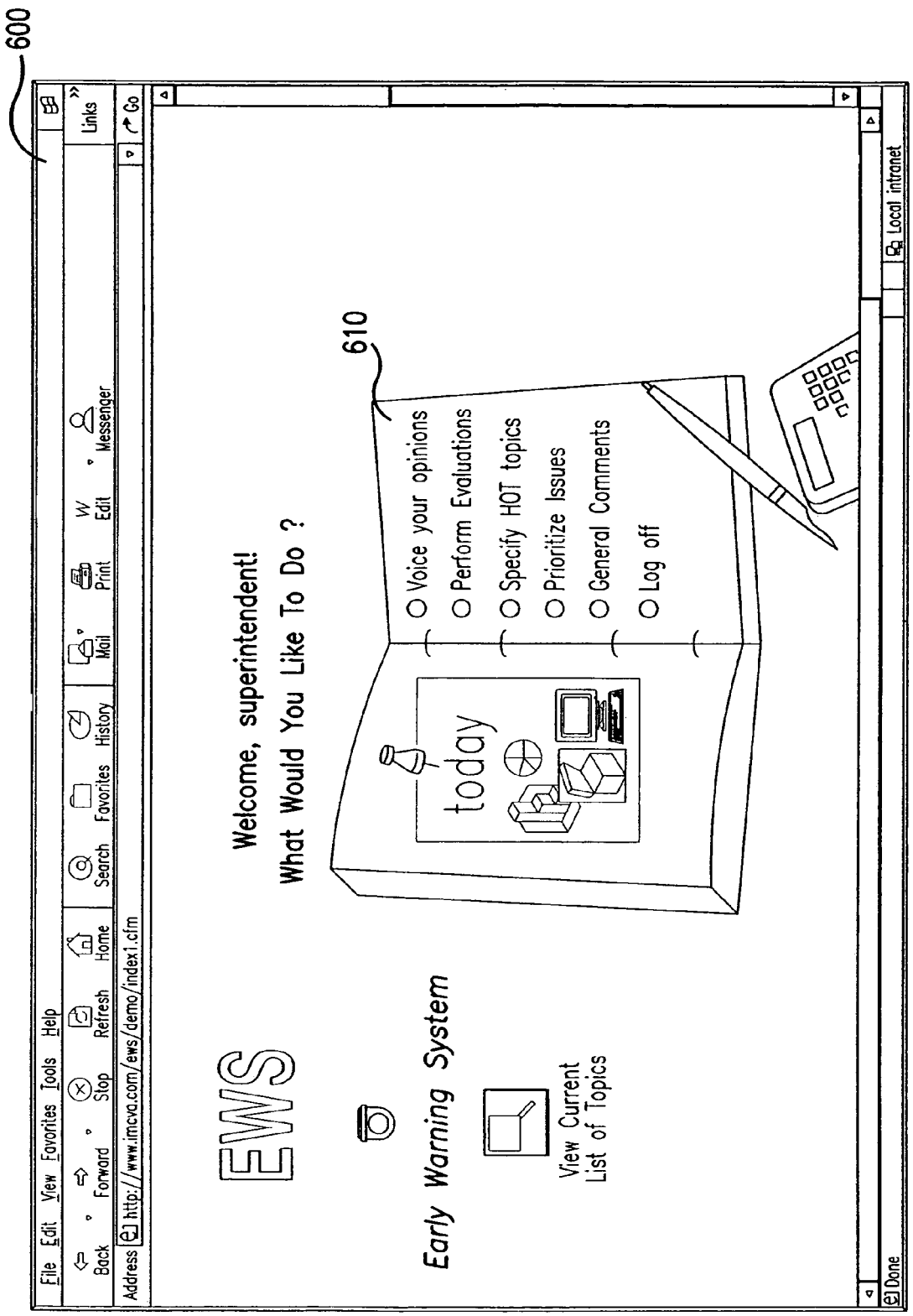
FIG. 6 is a view of an activity selection window of the system of FIG. 1.
Figure 8:
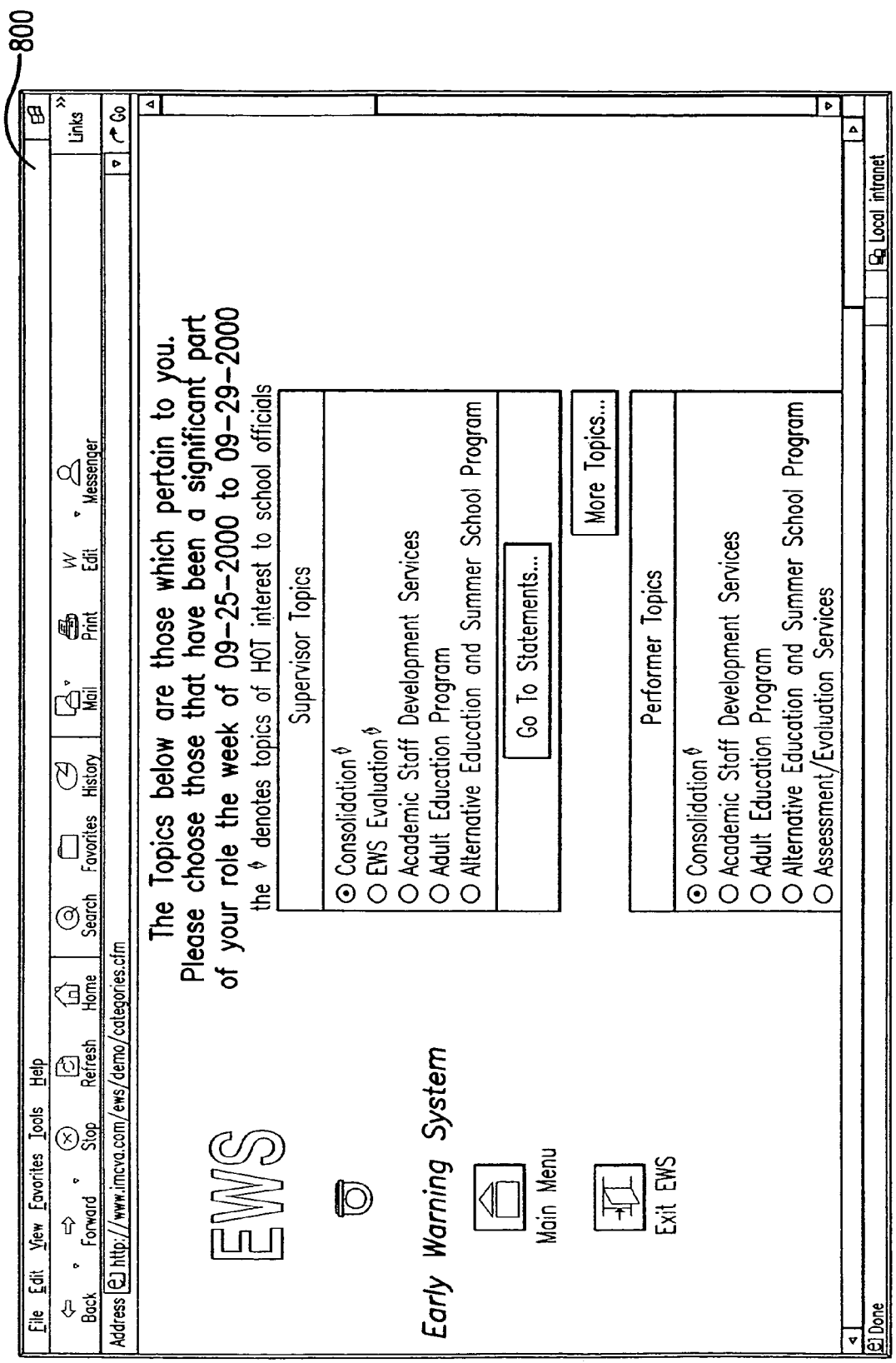
FIG. 8 is a view of a topic selection window of the system of FIG. 1.

System response—the system will store the data in the business rule database; later, the system provides the appropriate percentages to the software function that randomly selects the query statements from the database for each topic for every respondent. Note: this percentage will be used to ensure that whenever an issue is associated with a topic, that the appropriate percentage of queries related that issue are presented to each respondent who selects that topic Provide Perceptions and Opinions: Referring now back to FIG. 6, another important task a user may perform is to provide perceptions and opinions. If this activity is selected from listing 610 (recall that not all activities in listing 610 may be presented for all users), the user is presented with the Topic Selection window 800 of FIG. 8, which lists topics from which the user may select topics for which to provide opinions. Upon selection of topics, the user is presented with the Query window 900 of FIG. 9. The Query window 900 provides a plurality of queries 910. The user clicks on a button corresponding to a response based on a 7 point Likert scale for each query 910.

The following actions/responses and business rules define this process in preferred embodiments:

User activity—the respondent selects "voice your opinions" from listing 610

System response—the system provides a list of topics that are appropriate for the respondent's user category chosen above—separate topics listed for each of three roles (customer, performer and supervisor) that a respondent might play Rules—the system will mark all "hot topics" (selected by a senior person as discussed above) that are appropriate for this respondent's user category and place them at the top of the list of topics from which the respondent may choose User activity—the respondent selects a topic for which he or she will provide feedback Rules—organizations establish if a respondent must select at least one or more "hot topics" before selecting a topic that is not listed as a "hot topic"

System response—the system provides a set of query statements on a "point and click" response screen (see FIG. 9). Query statements are chosen random randomly from the issues—matching the percentages by issue if the topic owner has specified a percentage for one or more issues. The percentages are stored in the business rule database.

Rules—the number of query statements for each topic is determined by the organization; they may change this as often as they deem desired.

User activity—the respondent chooses a response for each query statement from the 7 options that range from "strongly disagree" to "strongly agree;" respondent may select "n/a" which stands for "not applicable." After reviewing the responses the user may choose to respond to another topic, select an additional respondent category and repeat the process starting with select topic, or log-off.

Rules—the organization determines how many topics a respondent may provide feedback on during each time period. This rule will apply to the number of topics for each role (respondent category) a user may belong to. That is, a user may respond to the chosen number of topics for each category he or she belongs to.

Perform Evaluation: This is one of the most important functions that is performed using the system. Upon selecting "perform evaluations" from listing 610, the user is presented with a Selection Window 1000 as shown in FIG. 10. The window 1000 includes a listing 1010 of all topics and issues in Table 2. The user may select any topic or issue which they are authorized to evaluate. In preferred embodiments, all levels of leadership/management are authorized to select topics and issues for evaluation. It is believed that one of the many benefits provided by the present invention is that a continuous feedback process will allow lower level leaders and managers to quickly spot many problems as they arise and take appropriate action before they become serious enough to attract the attention of more senior leaders/managers.

Figure 11:
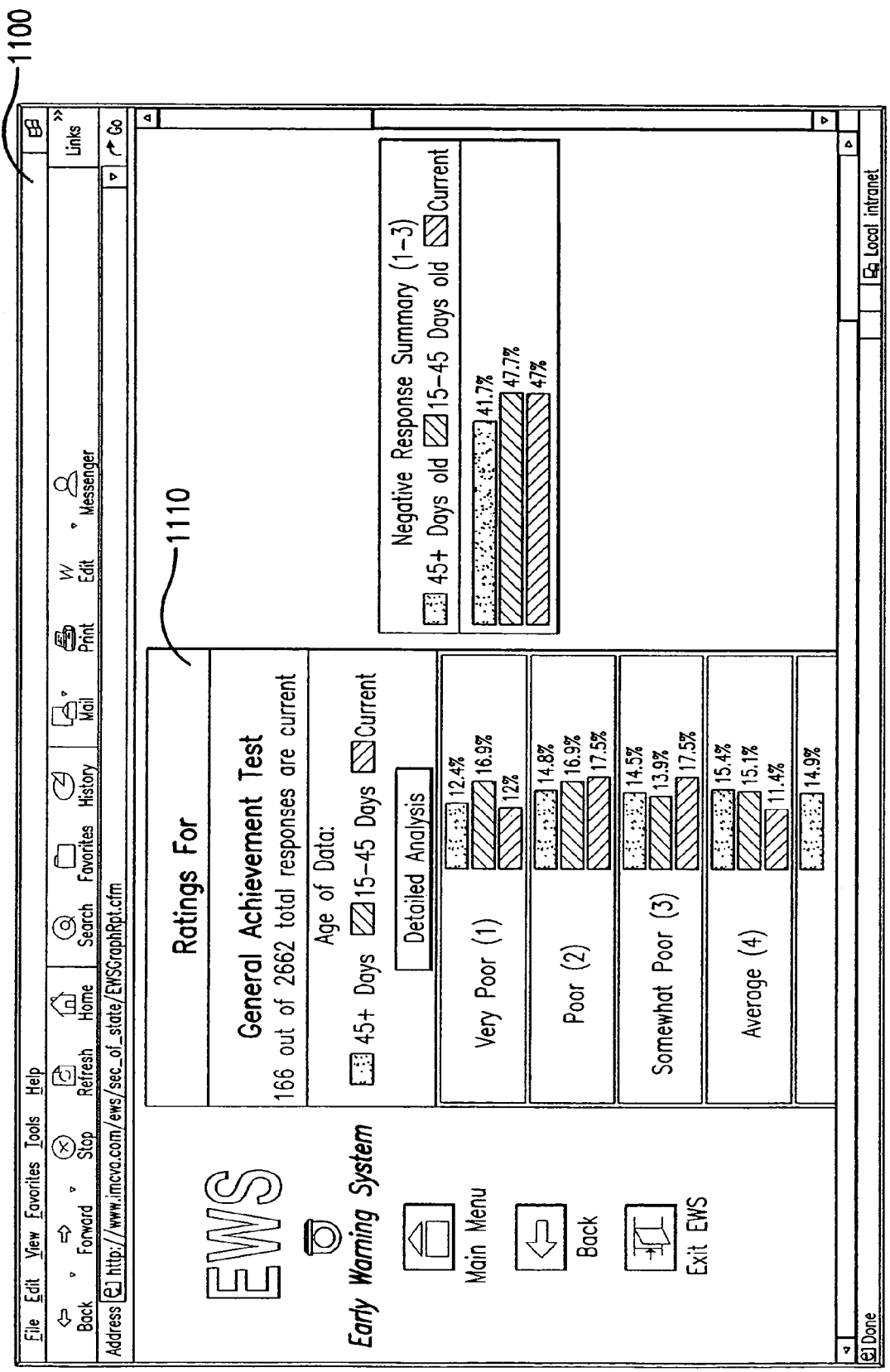
FIG. 11 is a view of a summary window of the system of FIG. 1.

If a topic is selected for analysis, a Summary window 1100 including a summary graph 1110 for that topic is presented as shown in FIG. 11. The summary graph 1110 shows all responses for all issues associated with the selected issue (in this case, the General Achievement Testing issue). The responses are divided temporally between current responses (less than 15 days old), responses between 15 and 45 days old, and response greater than 45 days old. The selection of these time periods is variable depending upon the needs of the organization.

Figure 12:
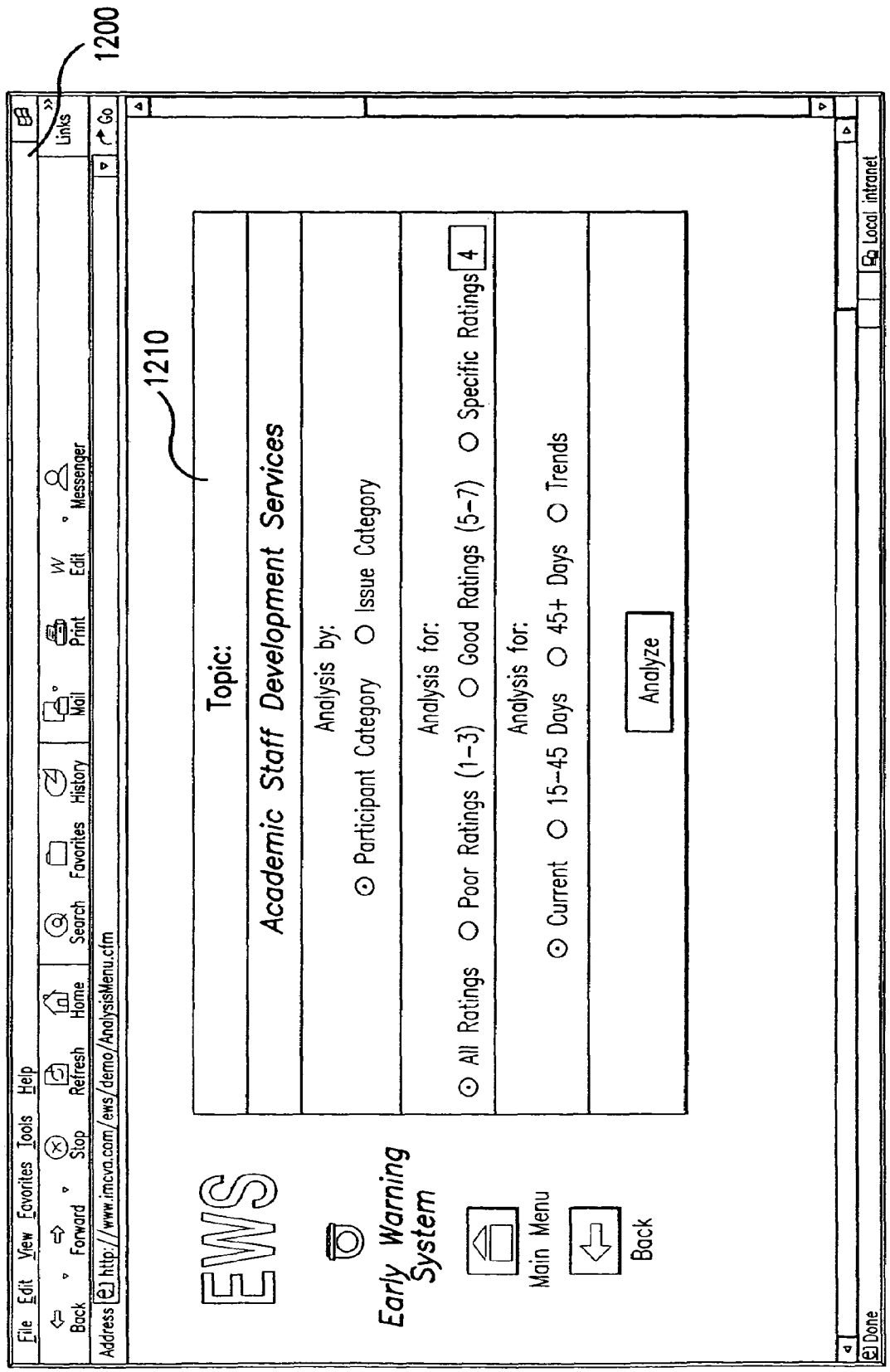
FIG. 12 is a view of an evaluation options window of the system of FIG. 1.

If a more detailed analysis is provided, the user is then provided with the Evaluation Options window 1200 of FIG. 12. The user may select to evaluate the responses by participant category or issues, and may choose whether to evaluate all ratings, negative ratings only, positive ratings only, or a specific rating number from the Likert scale. The user may also choose the time period of the data to be reviewed (e.g., current, etc.).

Figure 13:
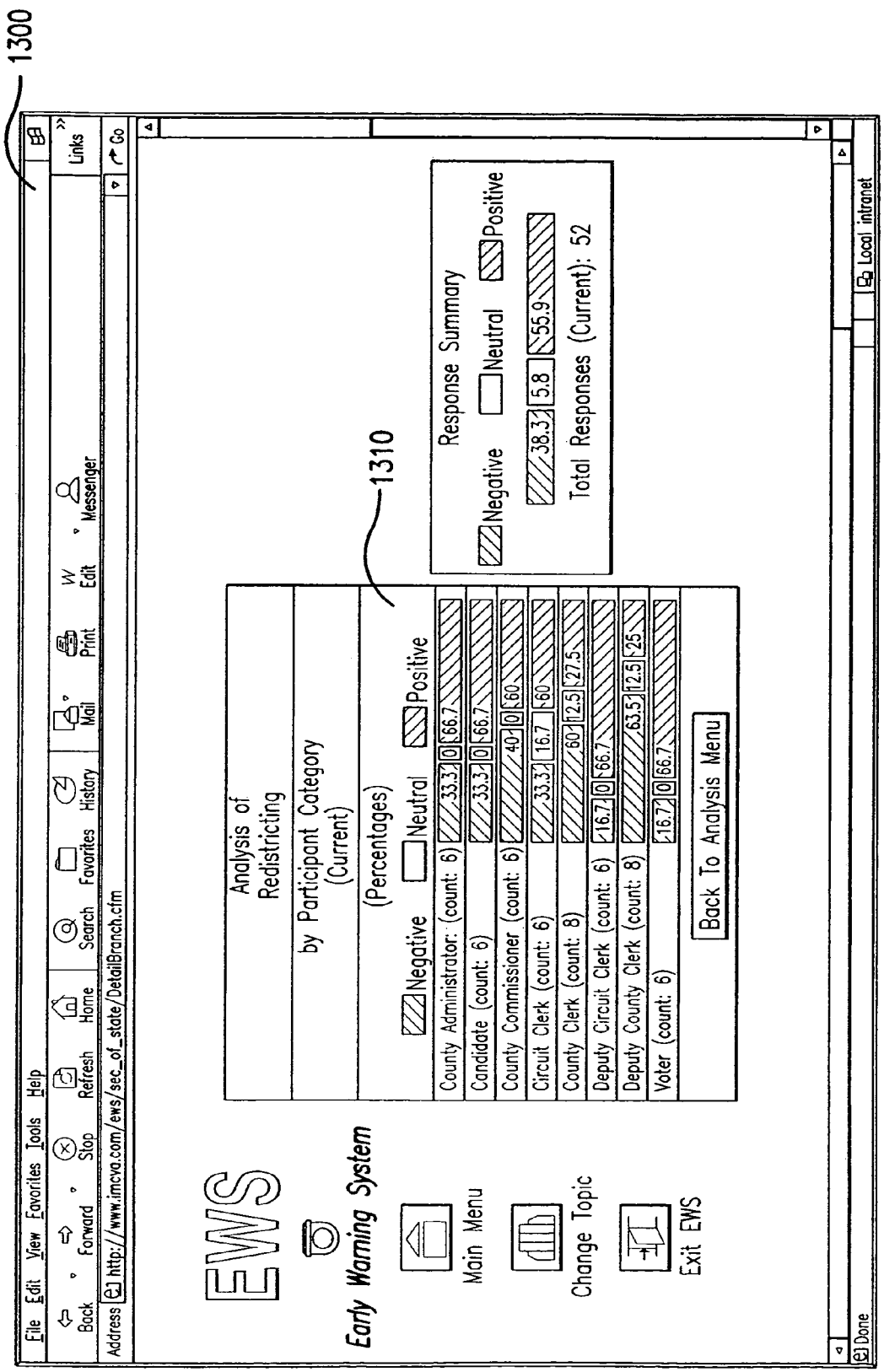
FIG. 13 is a view of a participant category evaluation window of the system of FIG. 1.

If the user chooses to evaluate responses by participant category, the Participant Category Evaluation window 1300 of FIG. 13 is displayed. This window 1300 includes a listing 1310 of responses (positive and negative) for all issues associated with the topic by participant category (the lowest categories listed in Table 1). The total numbers of query responses for each category is shown. This technique allows an evaluator to determine whether satisfaction or dissatisfaction is more prevalent among some groups rather than others.

Figure 14:
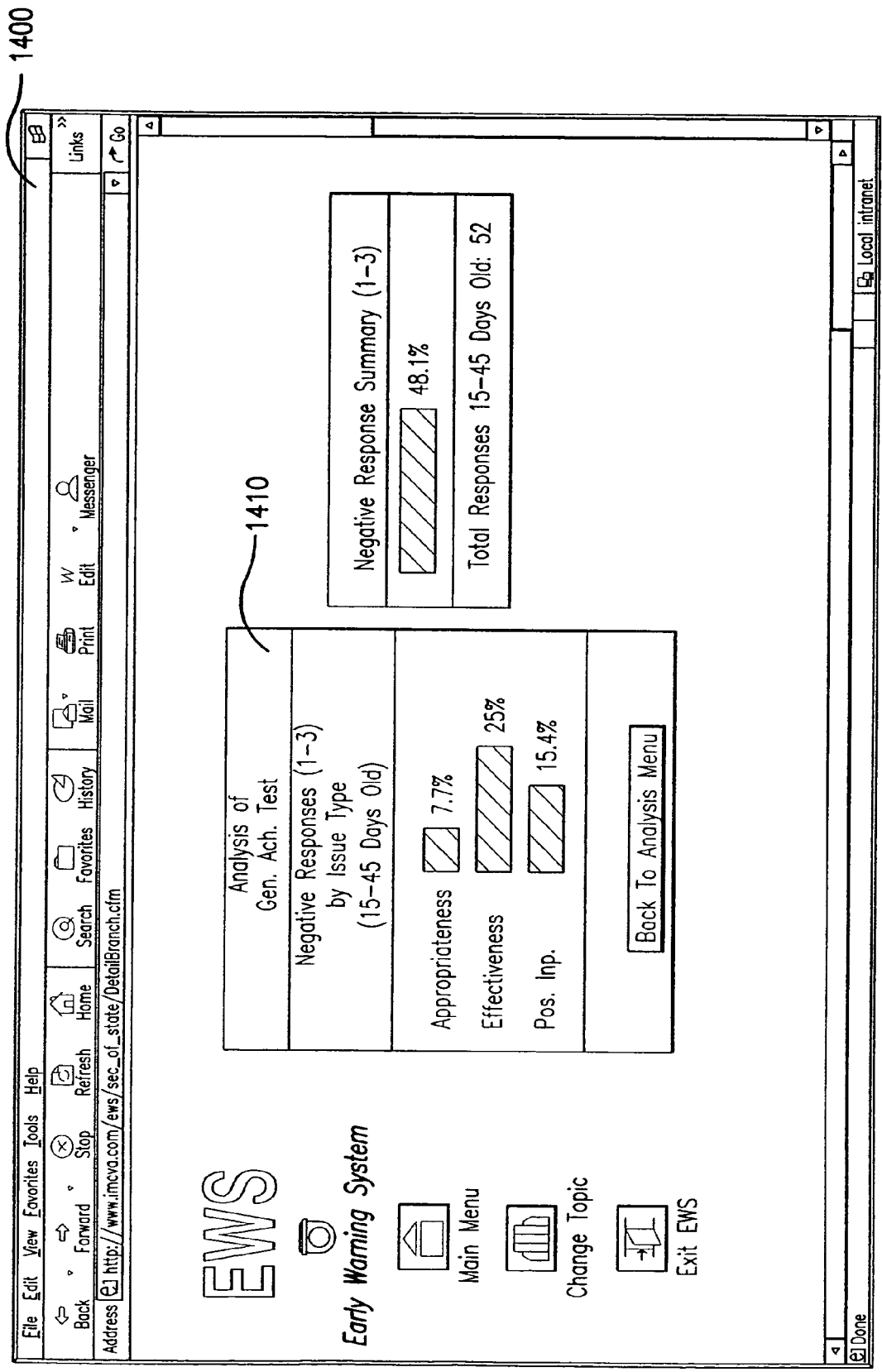
FIG. 14 is a view of an issue evaluation window of the system of FIG. 1.

If, on the other hand, the user chooses to analyze the data by issue, the Issue Evaluation window 1400 of FIG. 14 is displayed. Window 1400 includes a listing, by each issue in the topic, of the responses from all respondents (in FIG. 14, the user has chosen to analyze negative responses only by issue). This allows an evaluator to determine whether a specific issue if of particular concern for a given topic.

Figure 15:
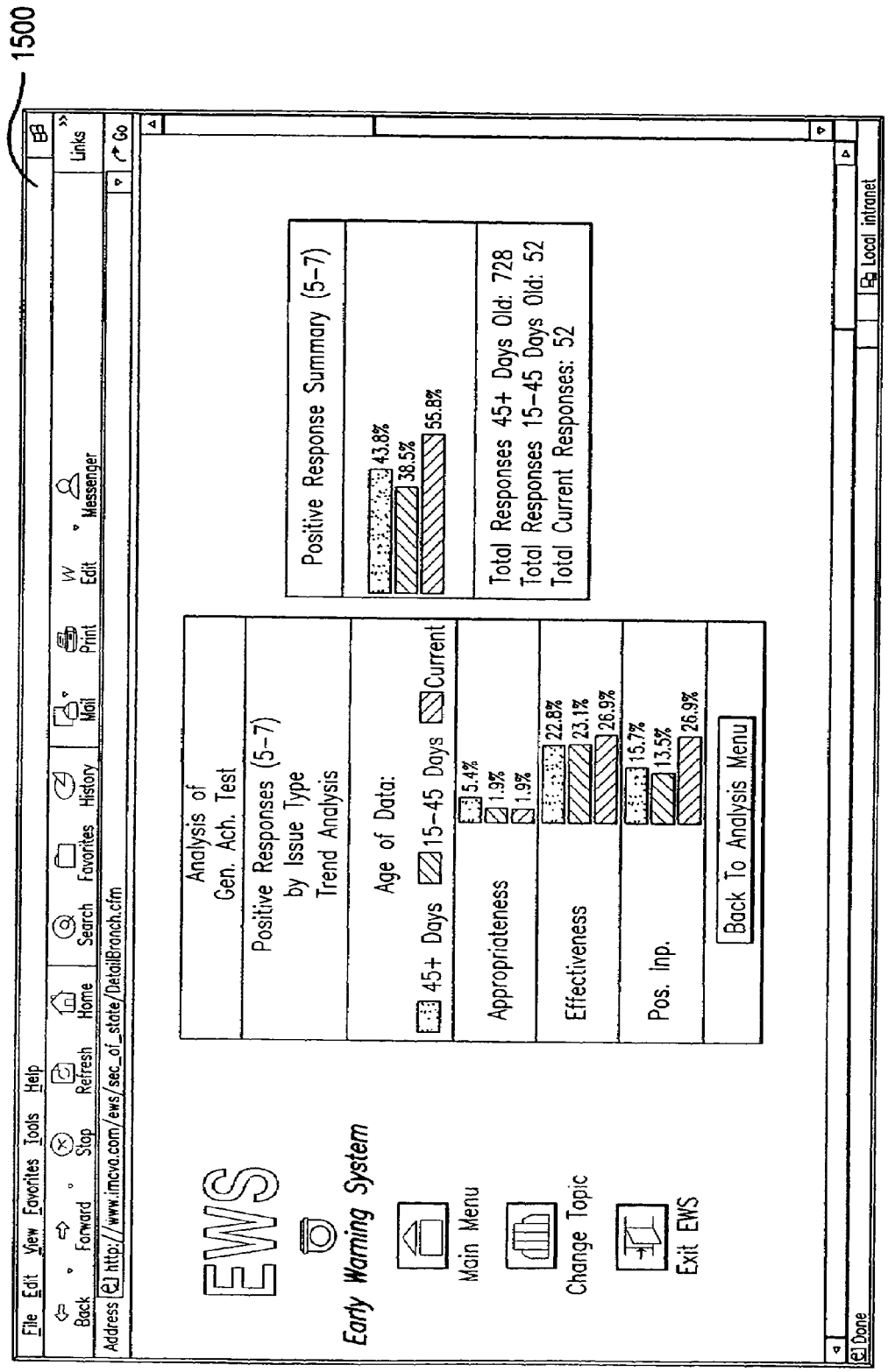
FIG. 15 is a view of a trend analysis window of the system of FIG. 1.

The user is also given the opportunity in window 1200 to specify trend analysis. In this case, a Trend Analysis window 1500 as shown in FIG. 15 is displayed to the user. This window 1500 shows the trend of the responses (in this case, the percentages of positive responses) over the previously discussed time periods. Thus, for example, there is a trend towards a perceived improvement in the effectiveness of general achievement testing over the time periods indicated in FIG. 15. Trend analysis helps leaders and managers quickly spot progress in addressing issues for issues applicable to a given topic.

Figure 17:
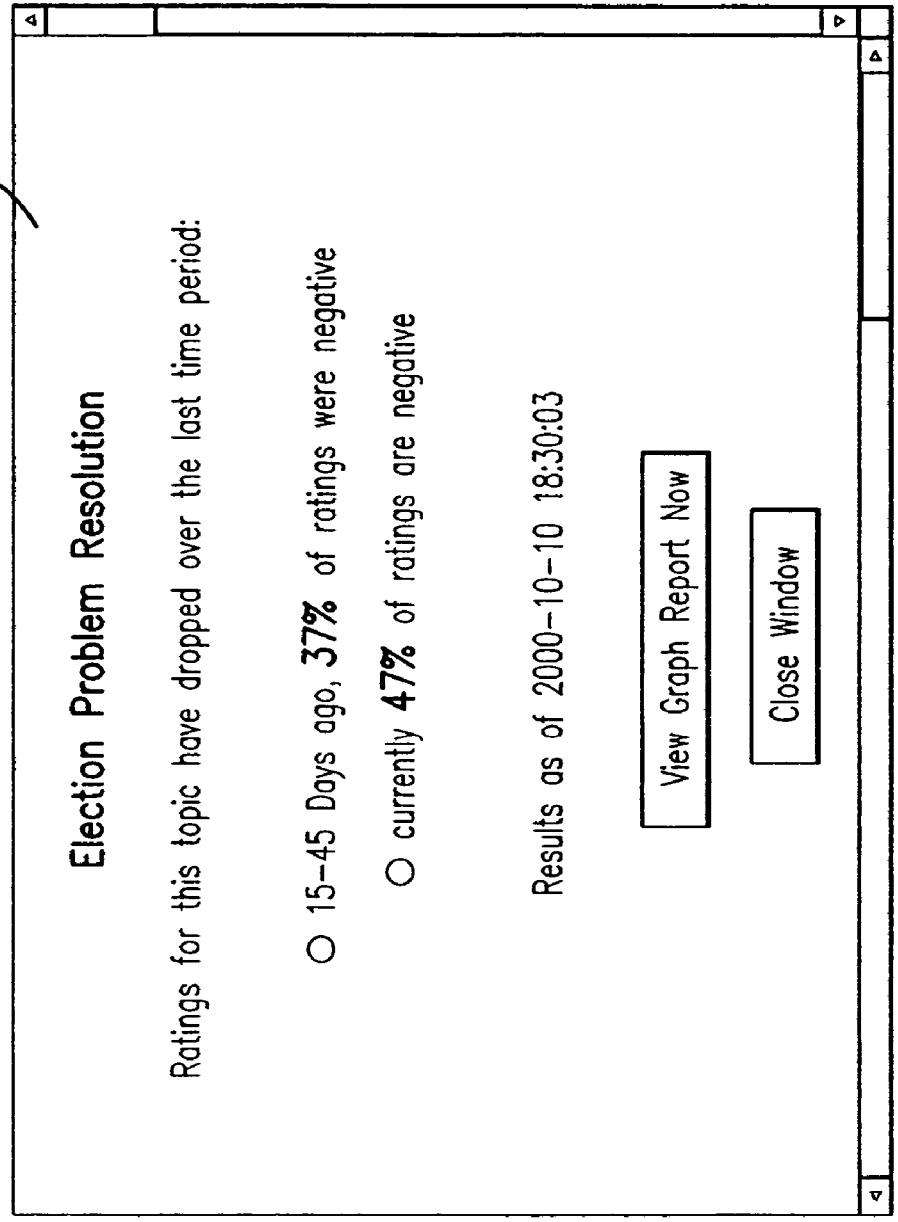
FIG. 17 is a view of a trend summary window of the system of FIG. 1.

In addition to the analyses described above, analysis for specific queries is also possible as shown in the Query Analysis window 1600 of FIG. 16. The window 1600 will include a listing 1610 of each query and a total of each desired point on the Likert scale in preferred embodiments. A summary window such as the Trend Summary window 1700 of FIG. 17 is also provided in preferred embodiments. In some embodiments, the system will automatically alert a user (preferably a user with leadership responsibility for a topic and/or issue, that a significant trend has developed. Significance can be measured by percentages; the threshold is preferably set by the user to be alerted. Thus, for example, the system can automatically alert (e.g., by sending email or posting a message on the first window the user sees upon logging on to the system) a leader to a drop of fifteen percent or more in the percentage of users currently providing positive comments on the topic of general achievement testing, measure with respect to old data (>45 days old) and/or newer data (14-45 days old).

The following actions/responses and business rules define this process in preferred embodiments:

User activity—the evaluator selects "perform evaluations" from listing 610

System response—the system provides as screen with either a list of topics and a list of issues the specific evaluator is authorized to evaluate; list will identify positive and negative trends for each topic and issue Rule—the organization assigns each topic and issue to an "owner;" this authorization is stored in the business rule database. An owner may authorize additional users to evaluate the topics and issues they own; these authorizations are stored in the business rule database User activity—the evaluator selects topic (options 1) or issue (option 2) by either clicking on the topic/issue Option 1

System response—the system provides a screen with a summary graph (histogram), reflecting the 7 potential Likert scale responses, that shows the results of all responses on this topic; also provide a summary of positive (the three blocks on the histogram with the highest ratings—5,6,&7) and negative responses (the three blocks on the histogram with the lowest ratings—1,2,&3) (see FIG. 11)

User activity—the evaluator reviews responses; if desired, evaluator selects: detailed analysis (option 1a), review trend summary by double clicking on the "trend icon" at the end of the summary (option 1b), return to previous menu that allows user to select a new topic or issue to evaluate (option 1c), or print the selected information (Option 1d).

Option 1a

System response—the system provides the evaluator with a menu that allows him or her to analyze the responses by: issue, respondent category, time period in which responses were received, or the specific response level on the 7 point scale (see FIG. 12)

User activity (option 1a)—the evaluator selects: a) issue or respondent user category; b) type of ratings (all ratings, all positive ratings, all negative ratings, or specific ratings), and c) age of data desired (one of three periods for which data is stored)

System response—the system provides a screen that shows the percentage of responses for each issue that falls in the response level chosen (see FIGS. 13, 14 and 15)

User activity—the evaluator reviews the information; evaluator can: print the screen (options 1a1), double click on any bar in the histogram to show specific query responses that provide the data for that bar (option 1a2), or return to the previous menu for choosing the type of detailed analysis (option 1a3).

Option 1a-1

System response—the system captures the page and sends it to the default printer Option 1a-2

System response—the system provides a screen that lists the specific query statements that were answered to provide the data in the bar that is double clicked; the list provides the total number of times each query statement was answered at each level on the 7 point Likert scale Option 1a-3

System Response—the system returns to the detailed analysis menu

Option 1b

System Response—the system provides a summary of the positive or negative trend data (see FIG. 17)

User activity—the evaluator can return to the list of "topics to evaluate" by clicking on the "close window" option, or the evaluator may "view the summary graph" by clicking on that option (this takes the user to the same graph described in option 1a above)

Option 1c

System Response—the system will return the user to the menu that allows him or her to select additional topics or issues to evaluate Option 1d System response—the system captures the page and sends it to the default printer Option 2

System response—this response and all subsequent system actions and responses are identical to those for Option 1 with the topics and issues interchanged.

User activity—this activity and subsequent user activities are identical to those for Option 1 with the topics and issues interchanged.

Rules—the rules are the same as for Option 1 with the topics and issues interchanged.

Generation of Reports: The system also provides the ability to generate customized reports. In preferred embodiments, customized reports comprise a selection of the analyses discussed above. The reports may be generated automatically at fixed intervals and/or may be generated upon request by an evaluator.

The following actions/responses and business rules define this process in preferred embodiments:

User activity—the user selects Generate Standard Reports from the main menu

System response—the system provides the user with a menu that contains all the customized reports available to the user Rules—the organization determines which customized reports they need and who has the authority to generate each report; this data is stored in the business rule database.

User activity—selects the report desired

System response—the system: 1) extracts responses for all queries that are relevant to the requested report, 2) stores relevant queries for each report in a table for that report in the response database, 3) performs statistical analysis, and 4) inserts the results into the report template.

System response—the system will provide an options menu on what to do with the report User activity—the user selects one or more from the options menu: print the report (option 1), store the report as a Microsoft Word document (option 2), email the report (option 3), and/or insert the report in another document (option 4).

Option 1

System response—the system captures the document and sends it to the default printer Option 2

System response—the system asks the user to specify a storage location

User Activity—the user selects the storage device, file and folder as appropriate Option 3

System response—the system checks to see if there is an Internet connection; if there is none it informs the user and allows him or her to establish a connection; if there is one the system provides the computers default email menu User Activity—the user provides email address and any message if desired. The user then attaches the report; if the report has not been stored the user must do this before attaching it to the email. The user then clicks on the email send button.

Option 4

System response—the system asks the user for the document that the report should be inserted into by specifying the file name and path User activity—the user specifies the file name and path System response—the system ensures that the document can accept a Microsoft Word document; if so it asks the user to specify the page in the document where the report is to be inserted; the system inserts the report in the documents and asks the user to "save" the document; if the document cannot accept a Microsoft Word document the system informs the user and allows him or her to return to the previous menu.

System Administration: This task comprises tasks associated with adding and removing queries, users, topics, issues, etc. to and from the system. The mechanics of these tasks will vary depending upon the specific application and will not be discussed in detail herein.

As discussed above, the system is intended to be used continuously. That is, users provide input in the form of responses to queries many times. For example, students, teachers and other users in a school system embodiment may answer queries daily, weekly, bi-weekly, or at some other periodic rate. In preferred embodiments, each time a user logs on and indicates that they wish to provide feedback, a new set of queries is selected from the database for each topic selected by the user. In preferred embodiments, between six and twelve queries are presented for each topic. These queries are spread among the issues applicable to the topic in the proportions selected by the topic owner. In some embodiments, queries are selected such that there is at least one query for each issue applicable to the topic. Because the database of queries for each topic is large (e.g., 80-400 per topic), the user will be presented with new questions each time he or she selects a given topic. Thus, although the user is providing opinions continuously, the user will not become disinterested by seeing the same questions each time they log on.

Obviously, numerous modifications and variations of the present invention are possible in light of the above teachings. It is therefore to be understood that within the scope of the appended claims, the invention may be practiced otherwise than as specifically described herein.

What is claimed is:

1. A method for gathering information from a plurality of users associated with a group over a communications network comprising the steps of:
   (a) storing a plurality of categories of users from whom information is desired in a first database;
   (b) storing a plurality of topics in a second database;
   (c) assigning each of the plurality of users to at least one category, the at least one category being selected from the plurality of categories stored in the first database;
   (d) presenting a plurality of topics to each of the plurality of users via the communications network, the topics presented to each user being applicable to the at least one category to which the user has been assigned;
   (e) receiving a selection of at least one desired topic from each of the users via the communications network;
   (f) presenting at least one query to each of the users via the communications network, the at least one query presented to each user being relevant to a corresponding desired topic selected by the user;
   (g) receiving a response to the at least one query from each of the users via the communications network;
   (h) storing the response from each of the plurality of users in an electronic storage medium; and
   (i) allowing a leader to review responses stored in the electronic storage medium, whereby the leader can obtain information relating to opinions and perceptions of the user.

2. The method of claim 1, wherein the response from each of the plurality of users is obtained using a Likert scale.

3. The method of claim 1, wherein the Likert scale is a seven point Likert scale.

4. The method of claim 1, wherein the leader is allowed to review all of the responses stored in the electronic storage medium.

5. The method of claim 1, wherein the leader is allowed to review less than all of the responses stored in the electronic storage medium.

6. The method of claim 1, wherein steps (d) through (h) are repeated a plurality of times for users associated with the group, whereby the leader can identify trends with respect to perceptions and opinions of the plurality of users.

7. The method of claim 1, further comprising the step of accepting from a leader a designation of a topic as a hot topic.

8. The method of claim 7, wherein the plurality of topics are presented in a list and a topic designated as a hot topic is displayed higher on the list than topics that are not designated as hot topics.

9. The method of claim 7, wherein the plurality of topics are presented in a list and a topic designated as a hot topic is marked by a special character when presented on the list.

10. The method of claim 7, wherein a user is forced to respond to at least one query corresponding to the hot topic.

11. The method of claim 1, wherein a plurality of issues are associated with each topic, and a plurality of queries are associated with each issue.

12. The method of claim 11, further comprising the step of accepting from a leader assigned to a topic a prioritization of issues associated with the topic to which the leader is assigned.

13. The method of claim 12, wherein the prioritization of issues is accomplished by accepting from the leader an assignment of a percentage of queries for each issue associated with the topic to which the leader is assigned.

14. The method of claim 1, wherein the at least one query presented to each user is based on at least one category to which the user has been assigned.

15. A system for gathering information from a plurality of users associated with a group over a communications network comprising:
   a first database comprising a plurality of categories of users from whom information is desired;
   a second database comprising a plurality of topics; and
   a server m communication with the first database, the second database and a communications network, the server configured to perform the steps of:
   (a) assigning each of the plurality of users to at least one category, the at least one category being selected from the plurality of categories stored in the first database;
   (b) presenting a plurality of topics to each of the plurality of users via the communications network, the topics presented to each user being applicable to the at least one category to which the user has been assigned;
   (c) receiving a selection of at least one desired topic from each of the users via the communications network;
   (d) presenting at least one query to each of the users via the communications network, the at least one query presented to each user being relevant to a corresponding desired topic selected by the user;
   (e) receiving a response to the at least one query from each of the users via the communications network;
   (f) storing the response from each of the plurality of users in an electronic storage medium based on the at least one category to which the user has been assigned; and
   (g) allowing a leader to review responses stored in the electronic storage medium, whereby the leader can obtain information relating to opinions and perceptions of the user.

16. The system of claim 15, wherein the response from each of the plurality of users is obtained using a Likert scale.

17. The system of claim 15, wherein the Likert scale is a seven point Likert scale.

18. The system of claim 15, wherein the leader is allowed to review all of the responses stored in the electronic storage medium.

19. The system of claim 15, wherein the leader is allowed to review less than all of the responses stored in the electronic storage medium.

20. The system of claim 15, wherein the server is configured to repeat steps (b) through (f) a plurality of times for users associated with the group, whereby the leader can identify trends with respect to perceptions and opinions of the plurality of users.

21. The system of claim 15, wherein the processor is further configured to perform the step of accepting from a leader a designation of a topic as a hot topic.

22. The system of claim 21, wherein the plurality of topics are presented in a list and a topic designated as a hot topic is displayed higher on the last than topics that are not designated as hot topics.

23. The system of claim 21, wherein the plurality of topics are presented in a list and a topic designated as a hot topic is marked by a special character when presented on the list.

24. The system of claim 21, wherein the server is configured to require a user is to respond to at least one query corresponding to the hot topic before presenting the user with any query not related to a hot topic.

25. The system of claim 15, wherein a plurality of issues are associated with each topic, and a plurality of queries are associated with each issue.

26. The system of claim 25, wherein the server is further configured to perform the step of accepting from a leader assigned to a topic a prioritization of issues associated with the topic to which the leader is assigned.

27. The system of claim 26, wherein the prioritization of issues is accomplished by accepting from the leader an assignment of a percentage of queries for each issue associated with the topic to which the leader is assigned.

28. The system of claim 15, wherein the at least one query is based on the at least one category to which such user has been assigned.

29. The system of claim 15, wherein the group is a school system and wherein the users include principals, superintendents, staff members, teachers, students and parents.

30. The system of claim 15, wherein the group is business and the users include managers, employees, and customers.

* * * * *